(12) United States Patent
Al-Hamad et al.

(10) Patent No.: US 9,818,037 B2
(45) Date of Patent: Nov. 14, 2017

(54) ESTIMATING HEADING MISALIGNMENT BETWEEN A DEVICE AND A PERSON USING OPTICAL SENSOR

(71) Applicant: InvenSense, Inc., San Jose, CA (US)

(72) Inventors: Amr Al-Hamad, Calgary (CA); Abdelrahman Ali, Calgary (CA); Jacques Georgy, Calgary (CA); Christopher Goodall, Calgary (CA)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 15/014,957

(22) Filed: Feb. 3, 2016

(65) Prior Publication Data

US 2016/0224855 A1 Aug. 4, 2016

Related U.S. Application Data

(60) Provisional application No. 62/111,897, filed on Feb. 4, 2015.

(51) Int. Cl.
G06K 9/00 (2006.01)
G06K 9/32 (2006.01)
G06K 9/46 (2006.01)
G01C 11/04 (2006.01)
G01C 21/10 (2006.01)
G06F 3/01 (2006.01)

(52) U.S. Cl.
CPC ............ G06K 9/3208 (2013.01); G01C 11/04 (2013.01); G01C 21/10 (2013.01); G06F 3/012 (2013.01); G06F 3/013 (2013.01); G06K 9/00228 (2013.01); G06K 9/3216 (2013.01); G06K 9/4652 (2013.01); G06K 9/00362 (2013.01)

(58) Field of Classification Search
CPC . G06F 3/012; G06F 3/013; G06T 7/70; G06T 7/80; G06K 9/00362; G06K 9/3208; G06K 9/3216; G06K 9/4633
USPC ................. 382/151, 199, 117–118, 216, 294
See application file for complete search history.

(56) References Cited

U.S. PATENT DOCUMENTS

| | | | |
|---|---|---|---|
| 7,817,104 B2 | 10/2010 | Ryu et al. | |
| 8,395,655 B2 * | 3/2013 | Robinson | H04N 7/142 348/14.07 |
| 8,803,800 B2 | 8/2014 | Zambrano et al. | |
| 8,852,003 B2 * | 10/2014 | Oku | G06K 9/00248 463/29 |
| 9,069,948 B2 * | 6/2015 | Ahn | G06F 21/46 |
| 9,547,798 B2 * | 1/2017 | Plummer | G06K 9/00845 |
| 2007/0164988 A1 | 7/2007 | Ryu et al. | |
| 2009/0313584 A1 | 12/2009 | Kerr et al. | |
| 2010/0125816 A1 | 5/2010 | Bezos | |
| 2012/0036433 A1 | 2/2012 | Zimmer et al. | |

(Continued)

OTHER PUBLICATIONS

International Search Report and Written Opinion, dated Jun. 6, 2012, for International application No. PCT/US2016/016435, Mailing date May 24, 2016, 16 pages.

*Primary Examiner* — Daniel Mariam

(57) ABSTRACT

This disclosure is about a method and apparatus for estimating heading misalignment between a device and a person, where the device/apparatus comprises an optical sensor, the optical sensor capable of capturing an image of the person. At least one physical feature of the person is extracted from the image. A misalignment angle is estimated using the at least one physical feature of the person extracted from the image.

28 Claims, 22 Drawing Sheets

(56) References Cited

U.S. PATENT DOCUMENTS

| | | |
|---|---|---|
| 2013/0141324 A1 | 6/2013 | Zambrano et al. |
| 2013/0181892 A1 | 7/2013 | Liimatainen et al. |
| 2013/0246954 A1 | 9/2013 | Gray et al. |
| 2014/0049563 A1* | 2/2014 | Tobin .................... G06F 3/012 345/649 |
| 2016/0078680 A1* | 3/2016 | Reif ..................... G06T 7/0044 345/633 |
| 2016/0216118 A1* | 7/2016 | Kazemipur ........... G01C 21/165 |

\* cited by examiner

1800

```
CAPTURE AN IMAGE OF THE PERSON BY THE OPTICAL SENSOR
1810
          │
          ▼
EXTRACT AT LEAST ONE PHYSICAL FEATURE OF THE PERSON
FROM THE IMAGE
1820
          │
          ▼
ESTIMATE A MISALIGNMENT ANGLE USING THE AT LEAST ONE
PHYSICAL FEATURE OF THE PERSON EXTRACTED FROM THE
IMAGE
1830
```

```
PERFORM PREPROCESSING ON THE IMAGE
1840
```

```
PERFORM EDGE DETECTION ON THE IMAGE OF THE PERSON
1850
            │
            ▼
IDENTIFY THE AT LEAST ONE PHYSICAL FEATURE OF THE
PERSON USING DETECTED EDGES OF THE IMAGE
1852
            │
            ▼
PERFORM A HOUGH TRANSFORM USING DETECTED EDGES OF
THE IMAGE
1854
```

```
PERFORM COLOR ANALYSIS ON THE IMAGE OF THE PERSON
1860
            │
            ▼
DETECT SKIN COLOR OF THE PERSON
1862
            │
            ▼
IDENTIFY THE AT LEAST ONE PHYSICAL FEATURE OF THE
PERSON USING THE DETECTED SKIN COLOR
1864
```

ESTIMATE A COARSE MISALIGNMENT ANGLE BETWEEN THE DEVICE AND THE PERSON, THE COARSE MISALIGNMENT ANGLE PROVIDING AN INDICATION OF RELATIVE ORIENTATION OF THE DEVICE FROM THE ORIENTATION OF THE IMAGE RELATIVE TO THE DEVICE
1870

DETERMINE A RELATION BETWEEN THE AT LEAST ONE PHYSICAL FEATURE OF THE PERSON RELATIVE TO A FRAME OF THE IMAGE
1872

IDENTIFY THE COARSE MISALIGNMENT BASED ON THE RELATION
1874

```
┌─────────────────────────────────────────────────────────────┐
│ ESTIMATE A FINE MISALIGNMENT ANGLE BETWEEN THE DEVICE AND   │
│ THE PERSON, THE FINE MISALIGNMENT ANGLE PROVIDING A VALUE   │
│ OF THE HEADING MISALIGNMENT BETWEEN THE DEVICE AND THE      │
│                          PERSON                             │
│                          1880                               │
└─────────────────────────────────────────────────────────────┘
```

| DETERMINE AN IMAGE LENGTH RATIO OF A FIRST PHYSICAL FEATURE OF THE PERSON TO A SECOND PHYSICAL FEATURE OF THE PERSON, WHEREIN AN ACTUAL LENGTH RATIO OF THE FIRST PHYSICAL FEATURE OF THE PERSON TO A SECOND PHYSICAL FEATURE OF THE PERSON IS KNOWN<br>1882 | DETERMINE AN IMAGE LENGTH RATIO OF A DISTANCE FROM A MIDDLE NECK POINT TO A LEFT SHOULDER SIDE TO A DISTANCE FROM THE MIDDLE NECK POINT TO A RIGHT SHOULDER SIDE<br>1886 |
|---|---|
| DETERMINE THE FINE MISALIGNMENT ANGLE USING THE IMAGE LENGTH RATIO AND THE ACTUAL LENGTH RATIO<br>1884 | DETERMINE THE FINE MISALIGNMENT ANGLE USING THE IMAGE LENGTH RATIO<br>1888 |

OBTAIN A HEADING OF THE PERSON FROM A HEADING OF THE DEVICE AND
THE MISALIGNMENT ANGLE
1890

1800 continued

USE THE MISALIGNMENT ANGLE TO PROVIDE AN ENHANCED NAVIGATION
SOLUTION
1892

ESTIMATING HEADING MISALIGNMENT BETWEEN A DEVICE AND A PERSON USING OPTICAL SENSOR

RELATED APPLICATIONS

This application claims priority to and the benefit of U.S. Patent Provisional Patent Application 62/111,897, filed on Feb. 4, 2015, entitled "Heading Misalignment Angle Estimation Using Images from Portable Devices Cameras," by Al-Hamad et al., and assigned to the assignee of the present application, which is hereby incorporated by reference in its entirety.

BACKGROUND

Portable electronic devices, such as those configured to be handheld or otherwise associated with a user, are employed in a wide variety of applications and environments. The ubiquity of devices such as mobile phones, smart phones, and other similar devices indicates the popularity and desire for these types of devices. Increasingly, such devices are equipped with one or more sensors or other systems for determining the position or motion of the portable device, including inertial navigation techniques based upon the integration of specific forces and angular rates as measured by inertial sensors (e.g. accelerometers, gyroscopes).

Often, such portable devices may be associated with a platform that transports the device, as in the example of a mobile/smart phone being carried by a person. Although the portable device generally may be transported in the direction of movement of the platform, its orientation is typically not constrained, resulting in a misalignment of a heading between the device heading and the platform heading. The heading misalignment is the difference between the frame aligned with the portable device and the frame aligned with the platform. As in the example of a mobile phone, it may be held in the user's hand and employed in a variety of orientations relative to the user.

Alignment of the inertial sensors within the platform (e.g., alignment of the portable electronic device containing the inertial sensors with the platform's forward, transversal and vertical axes) is typically required for traditional inertial navigation systems. Where the inertial sensors are not properly aligned, the positions and attitude calculated using measurements from the inertial sensors will not be representative of the state of the platform. As such, in order to achieve high accuracy navigation solutions, inertial sensors must be tethered within the platform. As presented above, portable electronic devices, however, are able to move relative to a user, whether constrained or unconstrained within the platform, and careful mounting or tethering of the device to the platform is not an option. Accordingly, knowledge of misalignment is a key factor in enabling an accurate navigation solution.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 18a-h illustrate a flow diagram of an example method for estimating heading misalignment between a device and a person, wherein the device comprises an optical sensor, according to various embodiments.

DESCRIPTION OF EMBODIMENTS

Figure 1:
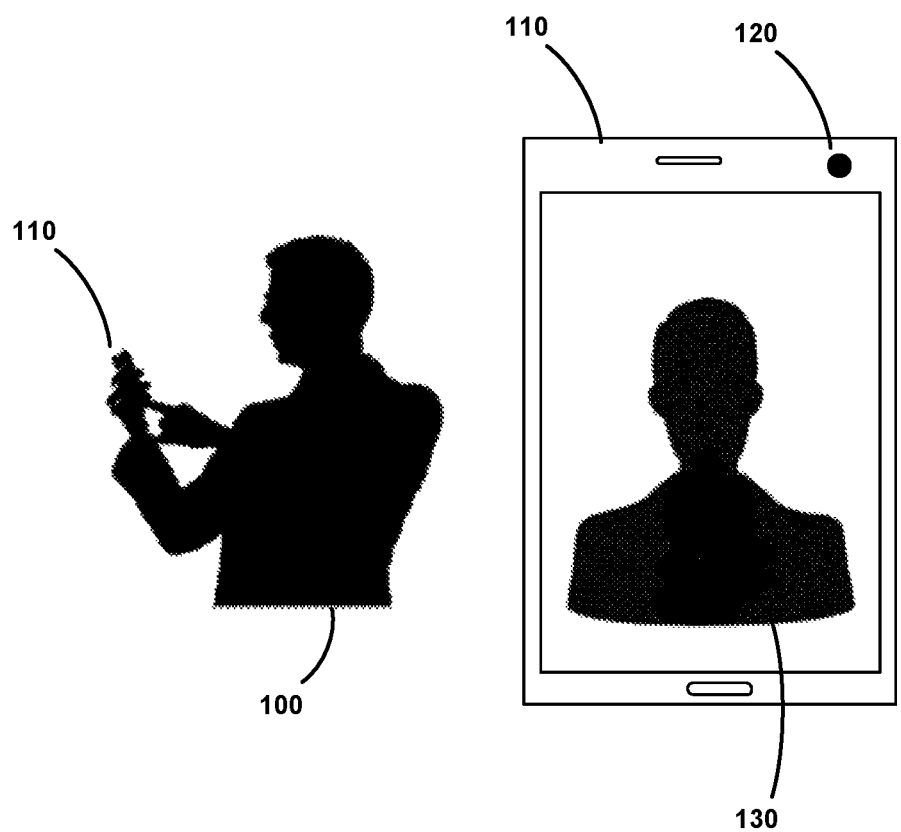
FIG. 1 shows an example of a person using a portable device having an optical sensor and an example image captured by the optical sensor as displayed on the portable device, in accordance with various embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "estimating," "capturing," "extracting," "performing," "identifying," "detecting," "determining," "correcting," or the like, refer to the actions and processes of an electronic device such as: a host processor, a processor, an optical sensor, a sensor, a memory, a mobile electronic device, a sensor processing unit, a sensor processor, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Example embodiments described herein improve the usability of electronic devices. The heading misalignment angle between a portable device and the user of the device is determined by use of an optical sensor (e.g. camera) of a mobile electronic device. The optical sensor is capable of capturing an image of a person. At least one physical feature of the person is extracted from the image. A misalignment angle is estimated using the at least one physical feature of the person extracted from the image. In various embodiments, the misalignment angle can be used to correct for the misalignment between the frame aligned with the portable device and the frame aligned with the platform.

The present disclosure relates to a method and apparatus for determining the misalignment between a device and a person, wherein the person can carry, hold, or use the device in different orientations in a constrained or unconstrained manner, and wherein the device includes an optical sensor. In various embodiments, the device also includes a sensor assembly. The sensors in the device may include for example, accelerometers, gyroscopes, magnetometers, barometer among others. The sensors have a corresponding frame for the sensors' axes. The misalignment between the device and the person means the misalignment between the frame of the sensor assembly in the device and the frame of the person.

Mobile electronic devices (also referred to herein as mobile devices, portable devices, portable electronic devices, etc.) such as smartphones, tablets, and smartwatches are frequently used computing devices that can be held or carried around and connected to a communication network. Typically, these devices have cameras on both the front (e.g., user-facing) side and back side. Both cameras are used commonly by users in the daily life activities and involved in many mobile applications.

Generally, these mobile electronic devices can have different orientation with respect to the user body. Consequently, the device can point to a direction different than the direction of the user movement. In the case of using pedestrian navigation applications, the dependency on the device heading sources such as from magnetometer, accelerometer, and gyroscope will not give the correct heading as the device heading is not the same as the user heading. Therefore, the estimation of the position and attitude of the device user has to be independent of the usage of the device (e.g. the way the user is holding or using the device during navigation). This refers to the importance of the determination of the heading misalignment angle between the device and the user. This will help enabling the mobile electronic device to be used in any orientation with respect to the user during the different activities. Thus, there is a need for an algorithm able to use the different information from the device to provide the heading misalignment without any constraints on the device orientation or the user to support the navigation solution.

The ubiquity of cameras in mobile devices (such as smart phones and mobile phones) allows for camera access as long as the person has his phone without any additional cost or size. Typically, these cameras allow for mobile imaging application capabilities where the user can use the touch screen to redirect the focus of the camera to a particular object in the view. Also, the camera can be used in other different applications besides taking photos such as reading and translating foreign language text, pinpoint for nearby locations, and scan different types of codes on products. Among the many types of applications that can be executed using mobile electronic devices are navigation applications or systems. In addition to a camera, many of the current mobile devices are equipped with motion sensors which can provide knowledge about a person's motion behaviors and physical activities. The integration between these different sources of navigation information and image allows the emerging of the photo geotagging applications.

During the use of a mobile electronic device in reading, texting, taking notes, or navigating using a navigation application, the camera can be used by the user as shown in FIG. 1. FIG. 1 shows an example of a person 100 using a mobile electronic device 110 having an optical sensor 120 (e.g., camera) and an example image 130 captured by the optical sensor 120 as displayed on the mobile electronic device 110, in accordance with various embodiments. In this example, the captured images from optical sensor 120 can be used to provide information about the direction of mobile electronic device 110 with respect to the user direction. Such information can improve the pedestrian navigation by compensating for the heading misalignment angle between the user and the mobile navigation device. For example, navigation systems in indoor environment would benefit from the knowledge about user direction. Different applications on mobile electronic devices utilize the inertial sensors (accelerometers and gyroscopes) and magnetometers to provide a basic indoor positioning solution starting from a known position for short time periods. However, these sensors may suffer from error drifting (in case of accelerometer and gyroscope) and disturbance (in case of magnetometer). Furthermore, the mobile electronic device can be used in different orientations with respect to the user direction of motion, providing device heading that is different from the user heading or direction of motion. In this case, there is a need to estimate the heading misalignment angle between the user direction of motion and the portable navigation device heading. This application is useful for navigation applications in all environments that have problem in accessing the GPS signal fully or partially, such as urban canyons and indoor areas.

Figure 2:
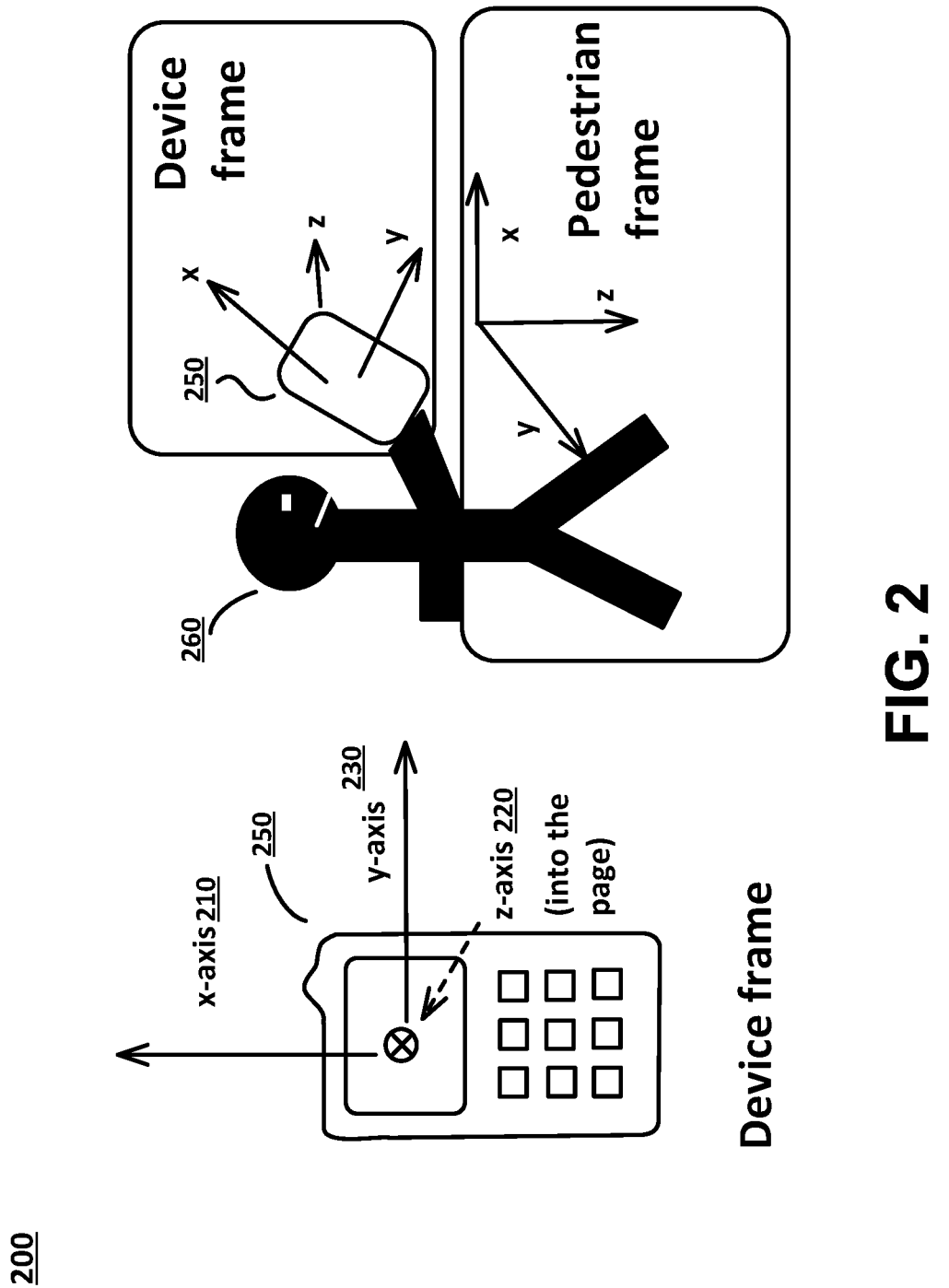
FIG. 2 shows an example of misalignment between a device and a platform, where the platform is a person.

FIG. 2 shows an example of misalignment between a mobile electronic device 250 and a platform, where the platform is a person 260. During normal use, the attitude of a mobile electronic device (e.g. mobile phone) changes freely. Indeed, such devices often undergo rotational movements along any of their major axes (e.g. the x-axis, y-axis and z-axis) when positioned, for example, for utilizing a navigation function in either landscape or portrait view. One example definition of device axes is presented in FIG. 2, wherein the forward axis 210 of mobile electronic device 250 is defined as x-axis, the vertical or z-axis 220 is pointing downward and the transversal axis or y-axis 230 is defined in a way to complete the right handed coordinate system.

The orientation of mobile electronic device 250 within a platform (in the described embodiment a person 260 carrying, holding or using the device) is not representative of the orientation of the platform or person. Mobile electronic device 250 may undergo any number of rotational movements along any of its major axes, with respect to the platform.

These rotational movements of mobile electronic device 250 do not indicate that the platform is going through the same changes in orientation. For example, the person 260 or platform may be moving on a levelled two-dimensional plane while mobile electronic device 250 may be undergoing any number of possible roll and pitch angles. FIG. 2 shows the relationship between an unconstrained mobile electronic device 250 and a person 260.

Estimating the heading misalignment between the user and the portable devices is useful for a navigation system to provide an accurate navigation solution. Embodiments described herein use the device camera, e.g., a front-facing camera, to estimate the misalignment angle. In one embodiment, the captured image from the device camera is processed to detect physical features (e.g., face or shoulder regions) of the user. Then, edge detection is performed to provide the outer edges of the person's face and shoulders. The combination of the image information and the device orientation is used to estimate the heading misalignment angle. The described embodiments can cover a wide range of different portable navigation devices' orientations.

To satisfy these constraints, the proposed method and device utilizes the images from the portable device camera to estimate the heading misalignment angle. While the device camera faces the user body, a part of the user body is captured by the camera in the reflected image. Some of the obtained images might contain information such as the user face and/or shoulders. Images with such information can be used in the heading misalignment angle estimation.

Discussion begins with a description of a mobile electronic device with an optical sensor. This is followed by some examples of operational descriptions of the heading misalignment estimation, including a discussion of edge detection, face detection, course heading misalignment angle estimation, fine heading misalignment angle estimation and integration of vision-based and sensors-based heading misalignment estimation. Various examples of heading misalignment angle estimation using shoulders are then described. Finally, operation of the mobile electronic device is then further described in conjunction with description of example method(s) of estimating misalignment angle between a device and a person.

Example Mobile Electronic Device

Figure 3:
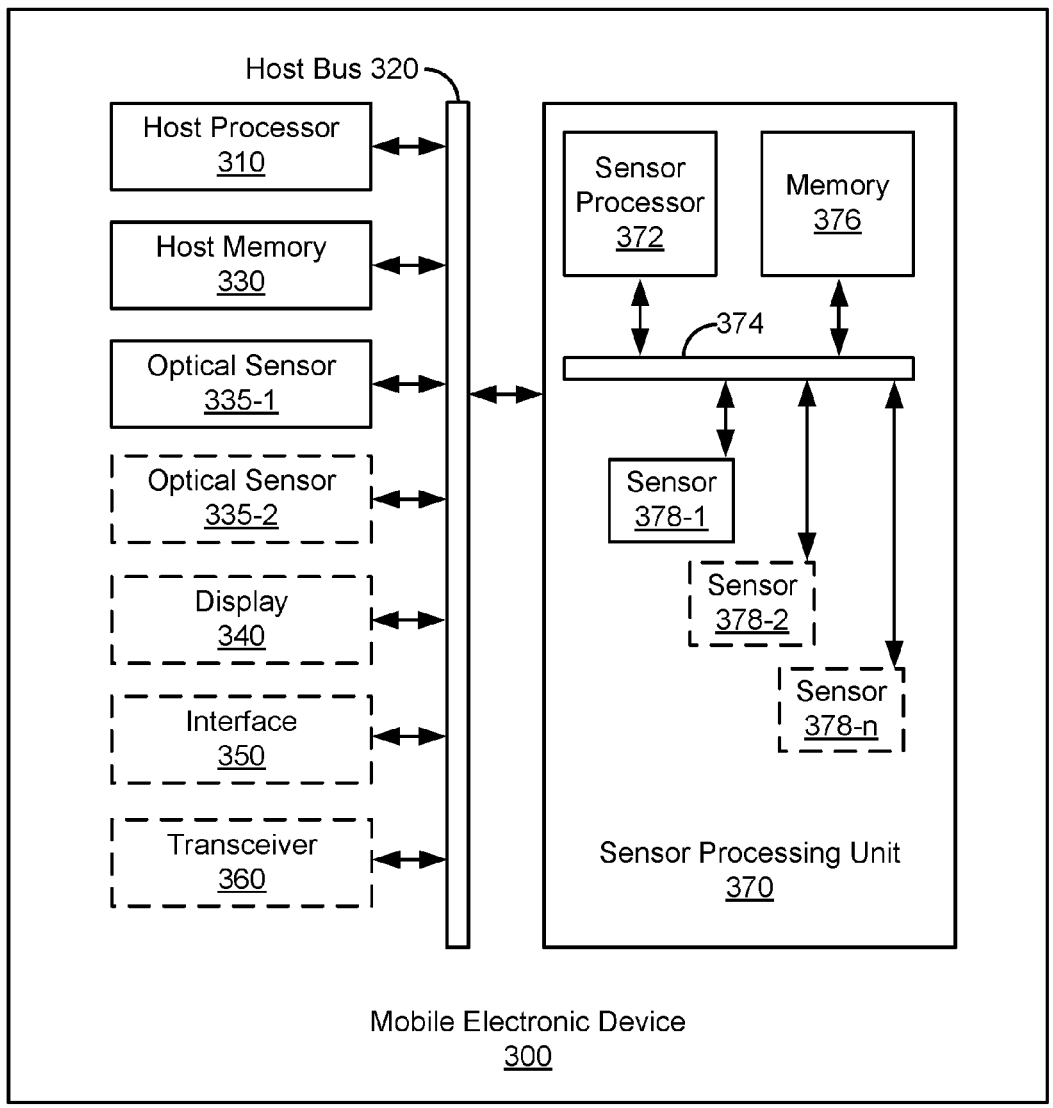
FIG. 3 is a block diagram of an example mobile electronic device, in accordance with various embodiments.

Turning now to the figures, FIG. 3 is a block diagram of an example mobile electronic device 300. As will be appreciated, mobile electronic device 300 may be implemented as a device or apparatus, such as a handheld mobile electronic device, that can be moved in space by a human user. That is, mobile electronic device 300 is small enough to be held in the hand of a human user, in various embodiments. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, or a combination of one or more of these devices.

As depicted in FIG. 3, mobile electronic device 300 may include a host processor 310, a host bus 320, a host memory 330, at least one optical sensor 335 (335-1 and 335-2), and a sensor processing unit 370. Some embodiments of mobile electronic device 300 may further include one or more of a display 340, an interface 350, a transceiver 360 (all depicted in dashed lines) and/or other components. In various embodiments, electrical power for mobile electronic device 300 is provided by a mobile power source such as a battery, when not being actively charged.

Host processor 310 can be one or more microprocessors, central processing units (CPUs), DSPs, general purpose microprocessors, ASICs, ASIPs, FPGAs or other processors which run software programs or applications, which may be stored in host memory 330, associated with the functions and capabilities of mobile electronic device 300.

Host bus 320 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 310, host memory 330, display 340, interface 350, transceiver 360, sensor processing unit 370, and other components of mobile electronic device 300 may be coupled communicatively through host bus 320 in order to exchange commands and data. Depending on the architecture, different bus configurations may be employed as desired. For example, additional buses may be used to couple the various components of mobile electronic device 300, such as by using a dedicated bus between host processor 310 and memory 330.

Host memory 330 can be any suitable type of memory, including but not limited to electronic memory (e.g., read only memory (ROM), random access memory, or other electronic memory), hard disk, optical disk, or some combination thereof. Multiple layers of software can be stored in host memory 330 for use with/operation upon host processor 310. For example, an operating system layer can be provided for mobile electronic device 300 to control and manage system resources in real time, enable functions of application software and other layers, and interface application programs with other software and functions of mobile electronic device 300. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single mobile electronic device 300, and in some of those embodiments, multiple applications can run simultaneously as part of the user experience system. In some embodiments, the user experience system, operating system, and/or the host processor 310 may operate in a low-power mode (e.g., a sleep mode) where very few instructions are processed. Such a low-power mode may utilize only a small fraction of the processing power of a full-power mode (e.g., an awake mode) of the host processor 310.

Optical sensor 335 may comprise, without limitation: a camera, and infrared camera, or other type of optical sensor for capturing an image of a person, an object or a scene. It should be appreciated that mobile electronic device 300 may include more than one optical sensor 335. In one example, optical sensor 335-1 is a front-side optical sensor (e.g., front-side camera) and optical sensor 335-2 is a back-side optical sensor (e.g., back-side camera).

Display 340, when included, may be a liquid crystal device, (organic) light emitting diode device, or other display device suitable for creating and visibly depicting graphic images and/or alphanumeric characters recognizable to a user. Display 340 may be configured to output images viewable by the user and may additionally or alternatively function as a viewfinder for camera.

Interface 350, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 360, when included, may be one or more of a wired or wireless transceiver which facilitates receipt of data at mobile electronic device 300 from an external transmission source and transmission of data from mobile electronic device 300 to an external recipient. By way of example, and not of limitation, in various embodiments, transceiver 360 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Mobile electronic device 300 also includes a general purpose sensor assembly in the form of integrated sensor processing unit (SPU) 370 which includes sensor processor 372, memory 376, at least one sensor 378 (378-1, 378-2, ... 378-n), and a bus 374 for facilitating communication between these and other components of sensor processing unit 370. In some embodiments, all of the components illustrated in sensor processing unit 370 may be embodied on a single integrated circuit. It should be appreciated that sensor processing unit 370 may be manufactured as a stand-alone unit (e.g., an integrated circuit), that may exist separately from a larger electronic device. Although depicted as a portion of mobile electronic device 300, in some embodiments, sensor processing unit 370 may be incorporated in an electronic device that is not mobile.

Sensor processor 372 can be one or more microprocessors, CPUs, DSPs, general purpose microprocessors, ASICs, ASIPs, FPGAs or other processors which run software programs, which may be stored in memory 376, associated with the functions of sensor processing unit 370.

Bus 374 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 372, memory 376, sensor 378, and other components of sensor processing unit 370 may be communicatively coupled through bus 374 in order to exchange data.

Memory 376 can be any suitable type of memory, including but not limited to electronic memory (e.g., read only memory (ROM), random access memory, or other electronic memory). Memory 376 may store algorithms or routines or other instructions for processing data received from one or more sensors 378, as well as the received data either in its raw form or after some processing. Such algorithms and routines may be implemented by sensor processor 372 and/or by logic or processing capabilities included in sensor 378.

A sensor 378 may comprise, without limitation: a temperature sensor, an atmospheric pressure sensor, an infrared sensor, an ultrasonic sensor, a radio frequency sensor, a navigation satellite system sensor (such as a global positioning system receiver), an acoustic sensor (e.g., a microphone), an inertial or motion sensor (e.g., a gyroscope, accelerometer, or magnetometer) for measuring the orientation or motion of the sensor in space, or other type of sensor for measuring other physical or environmental quantities. In one example, sensor 378-1 may comprise an acoustic sensor, sensor 378-2 may comprise a second acoustic sensor, and sensor 378-n may comprise a motion sensor.

In some embodiments, one or more sensors 378 may be implemented using a micro-electro-mechanical system (MEMS) that is integrated with sensor processor 372 and one or more other components of SPU 370 in a single chip or package.

Although depicted as being included within sensor processing unit 370, one, some, or all sensors 378 may be disposed externally to sensor processing unit 370 in various embodiments.

Example Heading Misalignment Estimation

Figure 4:
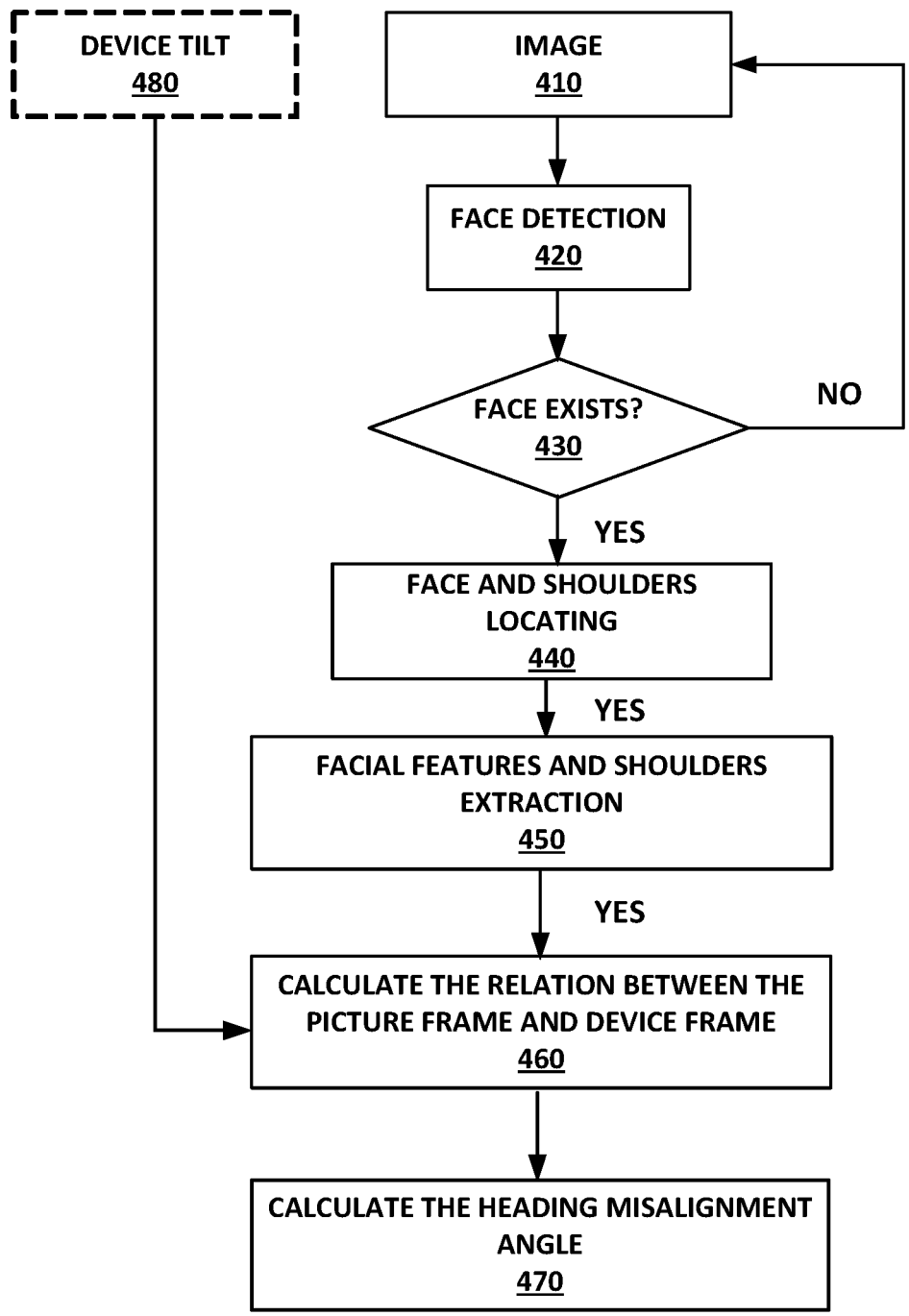
FIG. 4 shows a flow diagram of an example heading misalignment estimation process, in accordance with an embodiment.

Estimating the heading misalignment between the user and the portable navigation devices is useful for any navigation system to provide an accurate navigation solution. FIG. 4 illustrates a flow diagram 400 of an example heading misalignment estimation algorithm, according to various embodiments. Procedures of this method will be described with reference to elements and/or components of FIG. 3. It is appreciated that in some embodiments, the procedures may be performed in a different order than described, that some of the described procedures may not be performed, and/or that one or more additional procedures to those described may be performed. Flow diagram 400 includes some procedures that, in various embodiments, are carried out by one or more processors under the control of computer-readable and computer-executable instructions that are stored on non-transitory computer-readable storage media (e.g., host memory 330). It is further appreciated that one or more procedures described in flow diagram 400 may be implemented in hardware, or a combination of hardware with firmware and/or software.

The algorithm uses the device optical sensor (e.g., the front-side camera) to capture an image of the person using the device. The captured image from the device camera is processed to detect the user face and shoulders region. An edge detection technique is used to provide the outer edges of the person face and shoulders. The combination of the image information and the device orientation is used to estimate the heading misalignment angle.

At procedure 410, an image of the person is captured by the optical sensor (e.g., optical sensor 335 of FIG. 3). In one embodiment, the optical sensor is a front-side camera. In another embodiment, the optical sensor is a back-side camera. In other embodiments the optical sensor can be an infrared image sensor. It should be appreciated that the optical sensor can be configured to capture an image of the person without the person being aware of the capture. For example, while the user is using the mobile electronic device as a navigation system, the display of the electronic device will display the navigation information (rather than the captured image).

At procedure 420, face detection is performed on the captured image. In one embodiment, face and/or shoulder edges detection is used as a flag to decide whether to perform the misalignment estimation algorithm or to skip the process to the next received image from the camera. In one embodiment, detecting a face in the image is used to raise a flag that the image can be used for heading misalignment angle estimation. In another embodiment, detecting the shoulders of the person is used to raise a flag that the image can be used for heading misalignment angle estimation. For example, depending on the edges of the face, the face features alone might not provide enough information to determine the heading misalignment angle. In such situations additional features, such as the shoulders, might be used to determine the heading misalignment angle.

Edge Detection

Edges in images are abrupt change in the intensity of the image pixels. An edge can be defined as a discontinuity in image brightness or contrast. In general, edges correspond to important changes in physical or geometrical properties of objects in the image. Edge detection is used in deriving edge representation. Edge detection is the process of identifying and locating edges to be used in image analysis and can be used to reduce the unnecessary information in images and keep the image basic structure. Also, edge detection can be used to recognize objects and boundaries. There are many ways to perform edge detection. For example, some edge detection methods are based on the analysis of the image derivatives. In various embodiments, as differential operators are sensitive to noise, a preprocessing such as smoothing may be performed to reduce the noise. Due to the noise in images being generally random, it can be difficult to efficiently remove it from the image data merely in a small window. So, many of the differential operators are of small size.

Edge detection methods can be grouped in two categories, gradient and Laplacian. The gradient methods use the maximum and minimum in the first derivative of the image to detect edges and compute the gradient magnitude horizontally and vertically. Sobel, Canny, Prewitt, and Roberts operators are examples of gradient edge detection. Alternatively, the Laplacian edge detection method searches for zero crossings in the second derivative of the image to find edges. Marrs-Hildreth is an example of a Laplacian edge detection method.

Face Detection

This is accomplished by separating face areas from non-face background regions. While face detection can be performed easily and effortlessly by humans, it frequently requires a significant effort in computer vision terms. Variations in images increase the complexity of the decision boundary between face and non-face regions. In various embodiments, face detection involves segmentation, feature extraction, and facial features verification. Face detection may also involve the extraction of the face from the background.

It should be appreciated that there are different approaches for face detection that may be used. Several techniques are based on the detection of local facial features using a low level feature extraction algorithms and the classification using statistical models of human face. Other methods are based on using several correlation templates to detect local sub-features called Eigen-faces. The described embodiments use feature-based techniques, artificial intelligence-based techniques, or a combination of both for face detection. While particular techniques are described, it should be appreciated that other techniques for face detection may also be use.

Figure 5:
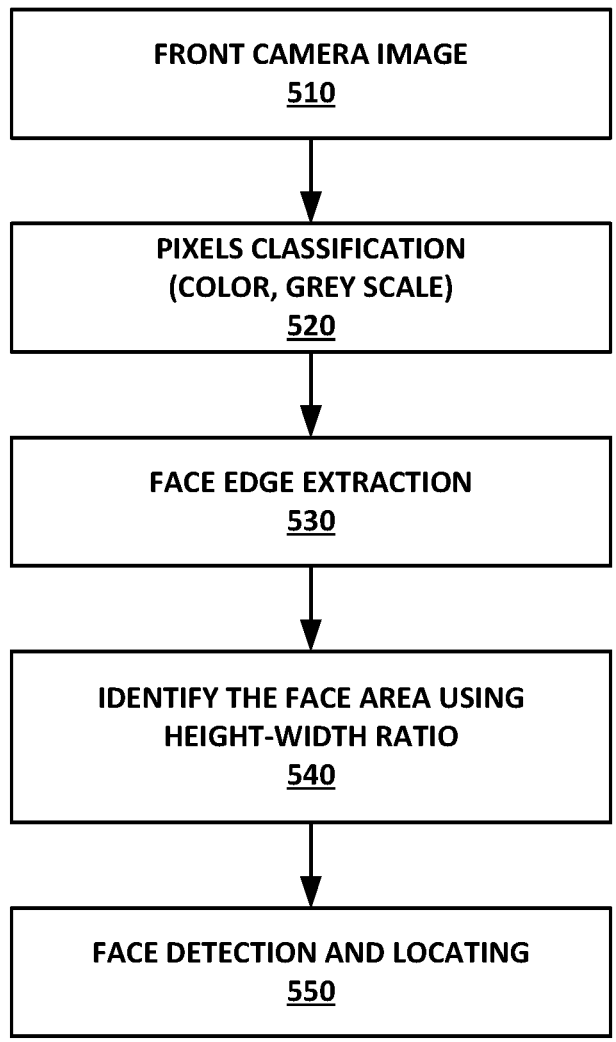
FIG. 5 shows a flow diagram of an example feature-based face detection process, in accordance with an embodiment.

With reference to FIG. 5, a flow diagram 500 of an example feature-based face detection algorithm is shown, in accordance with an embodiment. It is appreciated that in some embodiments, the procedures may be performed in a different order than described, that some of the described procedures may not be performed, and/or that one or more additional procedures to those described may be performed. Flow diagram 500 includes some procedures that, in various embodiments, are carried out by one or more processors under the control of computer-readable and computer-executable instructions that are stored on non-transitory computer-readable storage media (e.g., host memory 330). It is further appreciated that one or more procedures described in flow diagram 500 may be implemented in hardware, or a combination of hardware with firmware and/or software.

At procedure 510, an image is received, for example, from a front-side camera of the mobile electronic device. In one embodiment, a low-level analysis of the image is performed. The low-level analysis considers pixel properties such as color, grey scale, and motion. However, the features provided by the low-level analysis are often ambiguous and can interfere with other items in the image. Thus, feature analysis may be used where the observed features are grouped into a more global concept of face. This can help in reducing ambiguities and detecting of the face in the image.

At procedure 520, pixels in the received image are classified as skin or non-skin pixel. This serves to recognize whether the pixel is a skin pixel or not, but is not used to identify whether a pixel belongs to a face area or not. In one example, the use of skin color information is used for constraining the search space and identifying whether a pixel is a skin pixel or a non-skin pixel. In one embodiment, a connectivity analysis is used to identify the different skin regions in the skin detected image. In one embodiment, the image is converted to grey scale (if it is not already in grey scale) for pixel classification. At procedure 530, face edge extraction is performed.

In one embodiment, the edge extraction is performed on the grey scale image. The grey scale information for the face can be used as features to detect faces. Different facial features region such as eyebrows, nose edge, and lips generally appear darker than their surrounding area. Based on that, the grey scale factor can be exploited to differentiate between the different facial parts. Different facial feature extraction algorithms may be performed that use the grey scale information in face detection. In one example, for each facial region the local gray minima is calculated after improving the quality of local dark patches and thereby make detection easier. Then, the facial features are extracted using gray-scale threshold. In other example, local maxima, which are defined by a bright pixel surrounded by eight dark neighbors, are used instead to indicate the bright facial spots such as nose tips.

In another embodiment, face features are extracted using the Hough Transform (HT). The Hough Transform is a feature extraction technique used in digital image processing and computer vision which is powerful global method for detecting edges. It transforms between the Cartesian space and a parameter space in which a straight line (or other boundary formulation) can be defined. The purpose of the technique is to find imperfect instances of objects within a certain class of shapes by a voting procedure. The classical Hough Transform was concerned with the identification of lines in the image, but later the Hough Transform has been extended to identifying positions of arbitrary shapes, most commonly circles or ellipses. It uses black/white images with Edges. The line is described using the polar coordinates parameters (ρ, θ) as in Equation 1.

$$x_i \cos\theta + y_i \sin\theta = \rho \quad (1)$$

Each parameter has range from minimum value to maximum value. For example, θ varies from −90 degrees to 89.5 degrees and ρ varies from a minimum positive value to the minimum of the image width and height. Each point that belongs to the line in the image (Cartesian) domain with coordinates ($x_i$, $y_i$) is transferred into curve line in the polar domain using Equation 1 by calculating a value for ρ at each θ=[$θ_{min}$ $θ_{max}$]. Finally, all points that lie on the line will intersect in one point. The set of x and y parameters for the intersected lines forms the corresponding line in the image domain. Using the same principles, Hough transform can be applied to detect circles, ellipses, and curves in images. This is can be achieved if the shape equation is handled appropriately. For example, Equation 2 show the circle characteristic equation based on radius r and center ($x_c$, $y_c$) information.

$$(x-x_c)^2 + (y-y_c)^2 = r^2 \quad (2)$$

This circle can be described as in Equations 3 and 4

$$x = x_c + r\cos(\theta) \quad (3)$$

$$y = y_c + r\sin(\theta) \quad (4)$$

So, the Hough transform is searching for the triplet of parameters ($x_c$, $y_c$, r) to determine a set of points (x, y).

In another embodiment, pixel classification is performed on a color image. Based on the color value, different shapes with similar grey information can be recognized from each other in a color space. More interestingly, different faces with different degrees of color for individuals can be classified to the same group using the color values. RGB representation is one of the most widely used color schemes where each color is defined by combinations of Red, Green, and Blue components. To avoid any effect due to the luminance change (brightness), the normalized RGB colors are generally preferred. The normalized RGB can be derived as shown in equations (5), (6) and (7):

$$r = \frac{R}{R+G+B} \quad (5)$$

$$g = \frac{G}{R+G+B} \quad (6)$$

$$b = \frac{B}{R+G+B} \quad (7)$$

Where r, g, and b are the normalized representative values for the actual R, G, and B color values respectively.

It should be appreciated that there are different color models that can be used besides the RGB mode for face detection. Besides RGB color models, there are several other alternative models currently being used in the face detection research. HIS (Hue, Saturation, Intensity) color representation can be used to extract facial features such as lips, eyes, and eyebrows. YIQ is another color mode that can be used for face detection. In this mode, Y component represents the luminance information, I stands for in-phase, and Q stands for quadrature. The conversion from RGB colors into YIQ representation effectively suppresses the background of other colors and allows the detection of small faces in a natural environment. The conversion between the two models can be achieved using the following equations (8) and (9):

From RGB to YIQ $$\begin{bmatrix} Y \\ I \\ Q \end{bmatrix} = \begin{bmatrix} 0.299 & 0.578 & 0.114 \\ 0.596 & -0.275 & -0.321 \\ 0.212 & -0.528 & 0.311 \end{bmatrix} \begin{bmatrix} R \\ G \\ B \end{bmatrix} \quad (8)$$

From YIQ to RGB $$\begin{bmatrix} R \\ G \\ B \end{bmatrix} = \begin{bmatrix} 1.0 & 0.956 & 0.620 \\ 1.0 & -0.272 & -0.647 \\ 1.0 & -1.108 & 1.705 \end{bmatrix} \begin{bmatrix} Y \\ I \\ Q \end{bmatrix} \quad (9)$$

Figure 6:
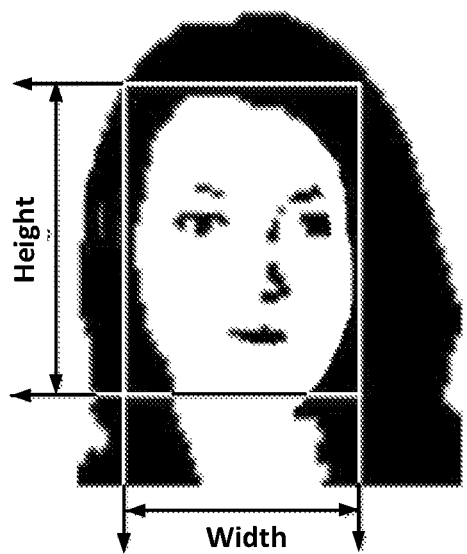
FIG. 6 shows an example of a face height-width ratio, in accordance with an embodiment.

At procedure 540, the detected skin regions are identified as face region or not. With reference to FIG. 6, an example face height-width ratio is shown, in accordance with an embodiment. In one embodiment, face region identification is determined using the ratio between the height and width of the detected region and the percentage of the skin color in the identified rectangle. For example, if the skin color percentage exceeds a threshold percentage and the height-width ratio of the rectangle is within a known range, the skin region will be identified as a face region. The output of procedure 540 is a determination of whether a face is detected and, if it is determined that a face is detected, a location of the face in the image. At procedure 550, upon identification of the face region, face detection and locating is completed.

Figure 7:
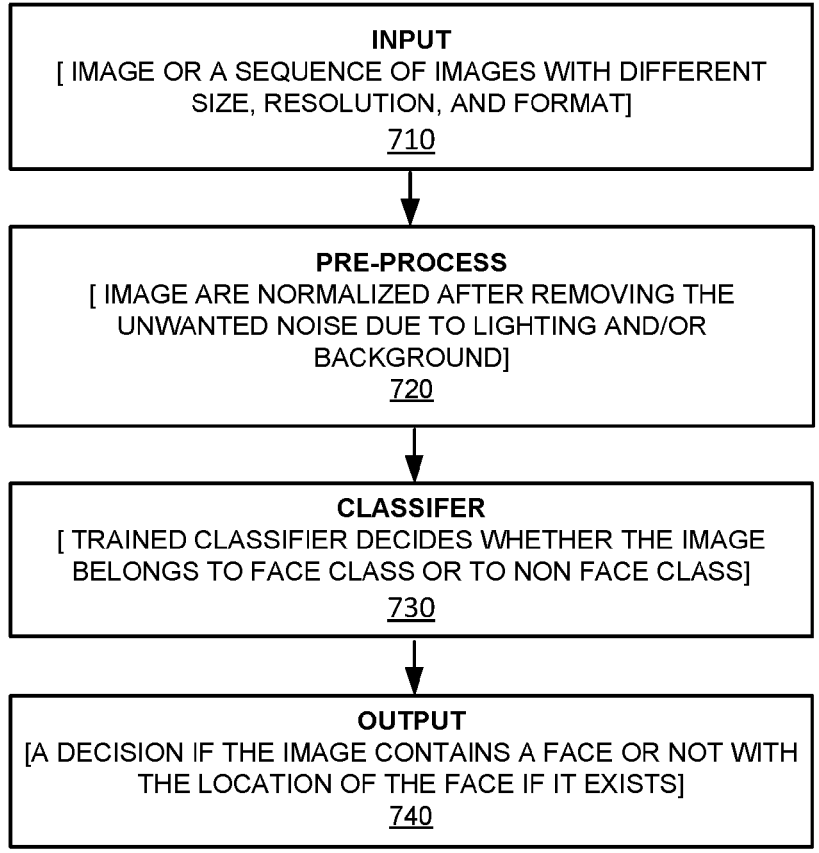
FIG. 7 shows a flow diagram of an example artificial intelligence-based face detection process, in accordance with an embodiment.

With reference to FIG. 7, a flow diagram 700 of an example artificial intelligence-based face detection algorithm is shown, in accordance with an embodiment. For example, different artificial intelligence techniques, Artificial Neural Network (ANN) as an example, are used for face detection application. Such techniques use a classifier for an image or a sequence of images captured by the user from the device camera. It is appreciated that in some embodiments, the procedures may be performed in a different order than described, that some of the described procedures may not be performed, and/or that one or more additional procedures to those described may be performed. Flow diagram 700 includes some procedures that, in various embodiments, are carried out by one or more processors under the control of computer-readable and computer-executable instructions that are stored on non-transitory computer-readable storage media (e.g., host memory 330). It is further appreciated that one or more procedures described in flow diagram 700 may be implemented in hardware, or a combination of hardware with firmware and/or software At procedure 710, an image is received, for example, from a front-side camera of the mobile electronic device. In one embodiment, as shown at procedure 720, images are pre-processed before being classified by the network to remove the noise due to lighting, environment, or background. At procedure 730, a trained classifier determines whether the image belongs to a face or a non-face class. At procedure 740, a decision regarding whether the image contains a face or not is output. In one embodiment, the output also includes to the location of the face.

With reference to FIG. 4, in one embodiment, as shown at procedure 430, it is determined whether a face is detected. If a face is not detected, flow diagram 400 returns to procedure 410 to receive and analyze another image. If a face is detected, flow diagram 400 proceeds to procedure 440. At procedure 440, the face and shoulder locating is performed. As presented above, the output of the feature-based face detection and the artificial intelligence-based face detection includes the location of the face, given a face being detected.

At procedure 450, physical feature extraction of the image of the person is performed. In one embodiment, the physical feature extraction is used to detect facial features and shoulders of the person. It should be appreciated that the physical feature extracted may include one or more a head, shoulders, ears, eyes, a nose, a neck, a mouth, and eyeglasses. Furthermore, it should be appreciated that feature extraction can be performed as described above using the feature-based face detection algorithm or the artificial intelligence-based face detection algorithm as applied to facial features.

Figure 8:
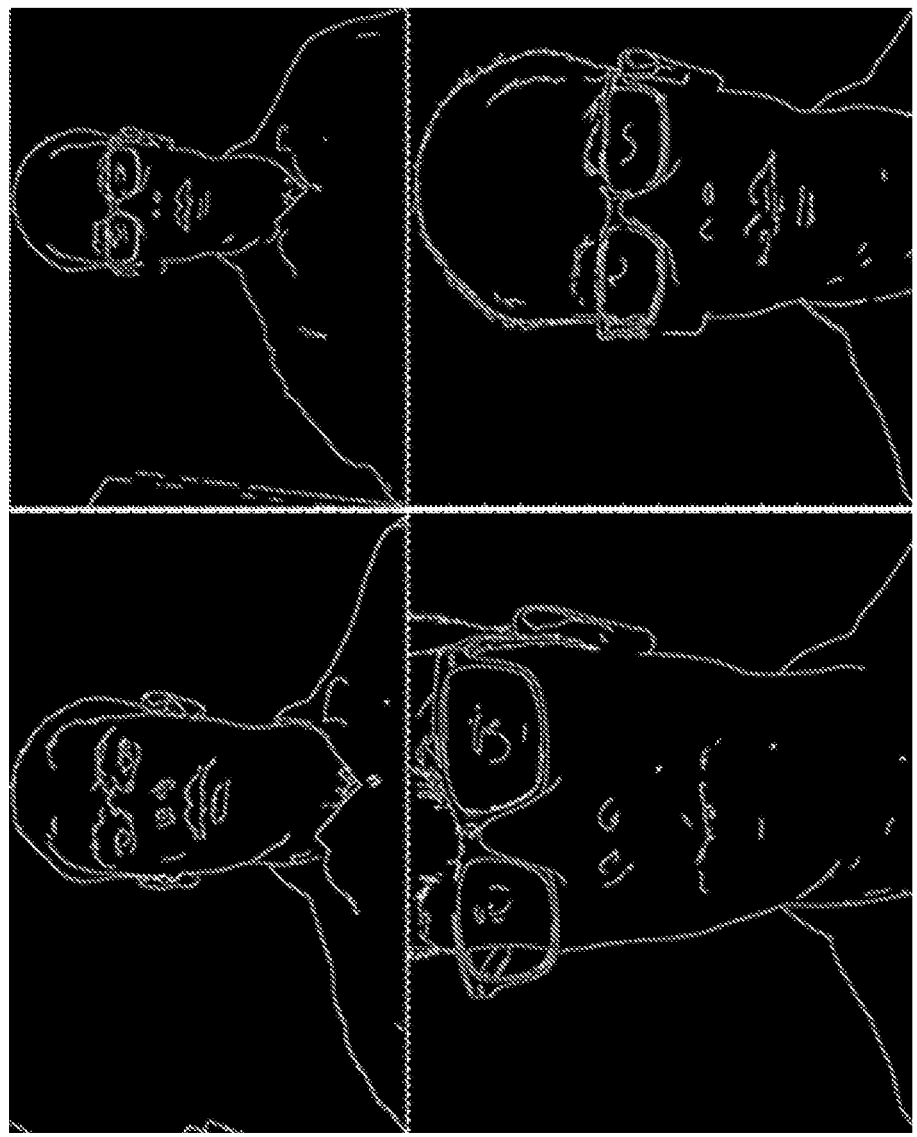
FIG. 8 shows examples of different appearance of the face and shoulders of a person with and without glasses, in accordance with an embodiment.

In accordance with the various described embodiments, a user's face, shoulder, or a combination of both is used for the heading misalignment angle estimation. This includes detecting and locating the user face/shoulder/combination in the captured images. To assess the contents of the captured image to determine whether it is valid for the estimation process, a decision flag is raised. This flag indicates that the captured image has a considerable part of the user body and can be used. The valid information could be the user face complete or part of it, the user shoulders complete or part of them, or a combination of the face and shoulders. It should be appreciated that the facial features can also be any interesting information. Facial features include eyebrows, eyes, ears, lips, nose, eyeglasses, a hat, earrings, or any other feature. The symmetry between some of the facial features can help in the determination of the heading misalignment angle. FIG. 8 shows examples of different appearance of the face and shoulders of a person with and without glasses, in accordance with an embodiment.

Detecting and locating the important facial features such as eyes, eye-brows, mouth, nose, and ears within a detected face helps in the estimation of the heading misalignment angle. In accordance with the described embodiments, the heading misalignment angle is calculated based on two procedures. The first procedure is to determine the relation between the capture user body part frame and the image frame. This will give an indicator about the orientation of the photo with respect to the device frame. The relation shows the direction of the user body part inside the image and how the device is used in portrait or landscape orientation. The extracted information about the device orientation gives a primitive result for the heading misalignment angle. This is referred to herein as the coarse heading misalignment angle estimation. The second procedure is to provide an accurate estimate of the value of the heading misalignment angle. This is referred to herein as the fine heading misalignment angle, and is discussed below.

At procedure 460, the relation between the picture frame and the device frame is determined. In one embodiment, procedure 460 includes estimating a coarse heading misalignment angle. In one embodiment, procedure 460 receive information on the device orientation (e.g., tilt) relative to the user, as determined in procedure 480. The information on the device orientation may be used to assist in the coarse heading misalignment angle estimation.

Coarse Heading Misalignment Angle Estimation

Figure 9:
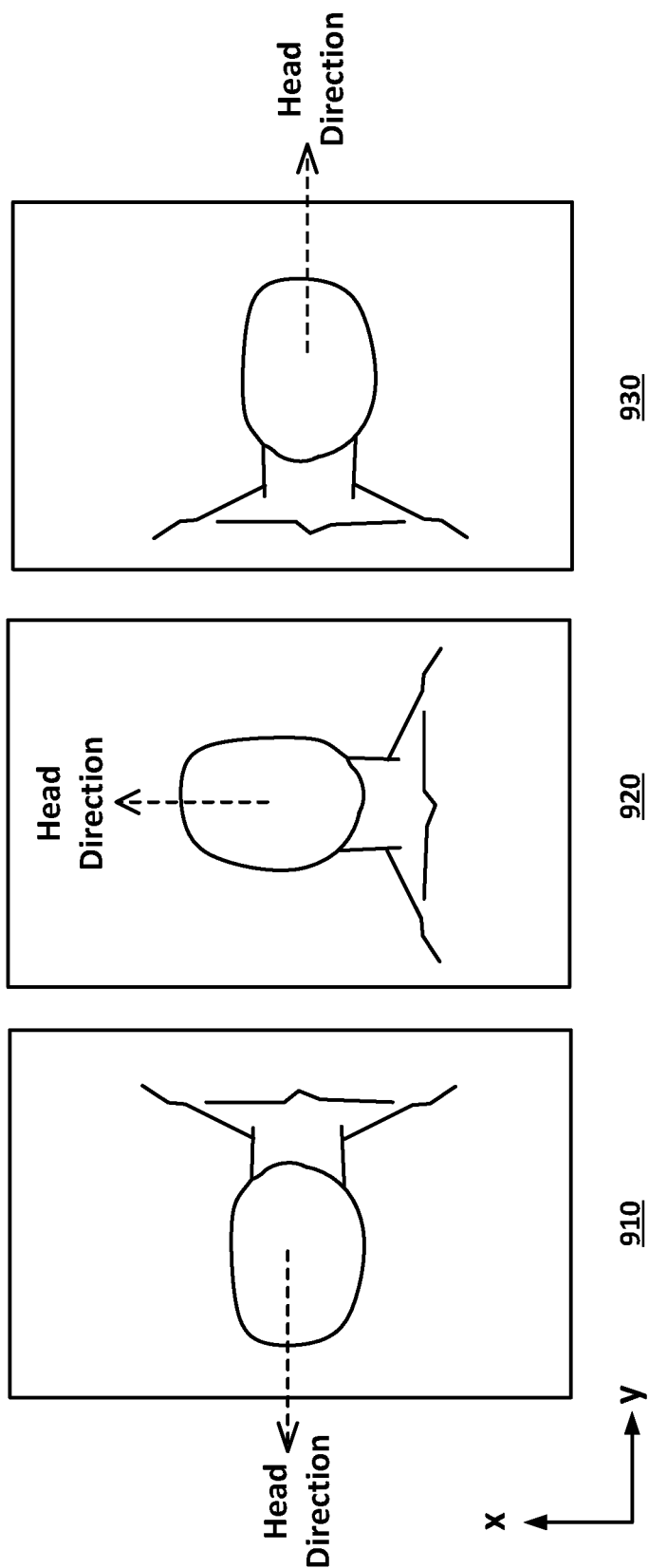
FIG. 9 shows three examples of possible directions for the captured images from a smartphone front camera, in accordance with various embodiments.

Head direction from bottom to top with respect to the direction of the captured image is used to determine the relation between the image frame and the device frame. FIG. 9 shows three examples of possible directions for the captured images from a smartphone front camera. In diagram 910, the head direction is the direction of -y axis meaning that the camera is in the landscape mode with 90 degrees. For example, where there is a speaker at the top of the smartphone, the phone speaker direction is to right side of the user. In diagram 920, the head direction points to the same direction as the x axis meaning that the camera is in the portrait mode (e.g., zero degrees). In the example where there is a speaker at the top of the smartphone, the phone speaker direction refers to the up direction of the user. In diagram 930, the head direction is the same as the y axis direction meaning that the camera is in the landscape mode with -90 degrees. In the example where there is a speaker at the top of the smartphone, the phone speaker direction is to left side of the user.

Figure 10A:
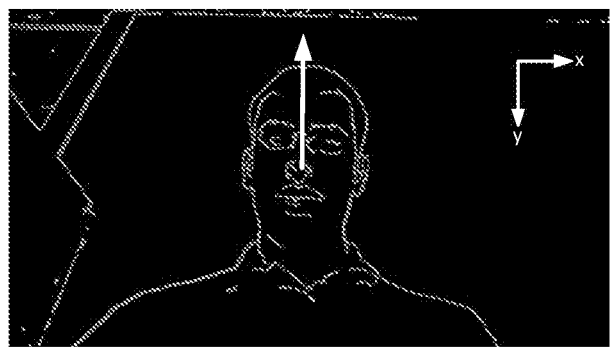
FIGS. 10a-10c show examples of the coarse misalignment determination, in accordance with various embodiments.
Figure 10B:
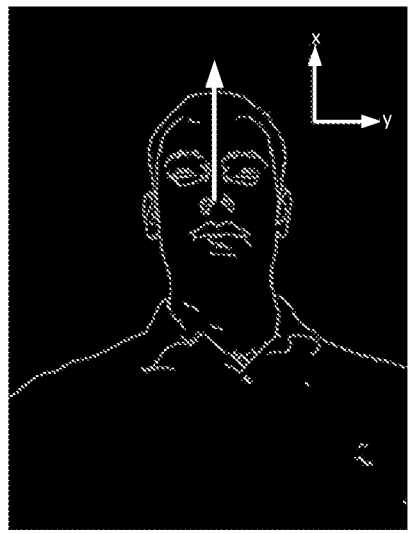
Figure 10C:
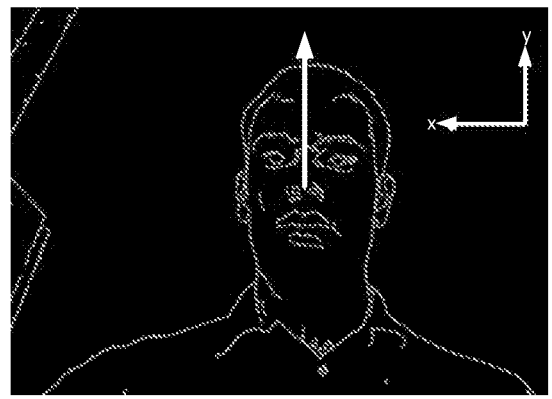

FIGS. 10*a*-10*c* show examples of the coarse misalignment determination described above. FIG. 10*a* illustrates a landscape mode with 90 degrees orientation with the speaker to the user's right side. FIG. 10*b* illustrates a portrait mode orientation with the speaker at the top of the smartphone. FIG. 10*c* illustrates a landscape mode with -90 degrees orientation with the speaker to the user's left side.

The extracted user facial features and/or the detected shoulders can be used to determine the direction of the head. FIGS. 11*a*-11*f* show examples of using facial features or shoulders to determine the direction of the person's head, indicating the misalignment of the mobile electronic device. The described embodiments illustrate the use of the person's shoulders, eyes, eyeglasses, ears, nose and mouth in determining the direction of the user's head.

Figure 11A:
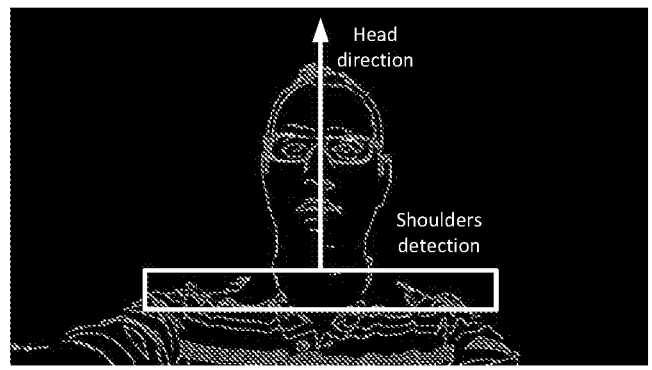
FIGS. 11a-11f show examples of using facial features to determine the direction of the person's head, indicating the misalignment of the mobile electronic device, in accordance with various embodiments.
Figure 11B:
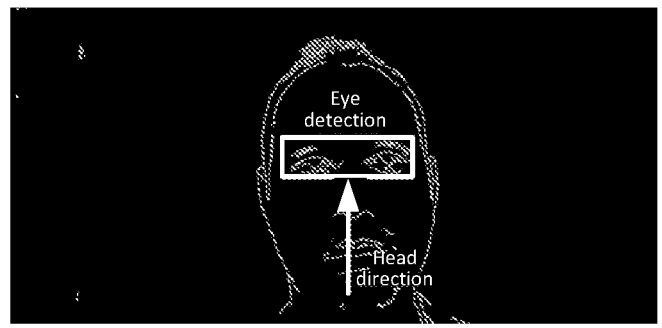
Figure 11C:
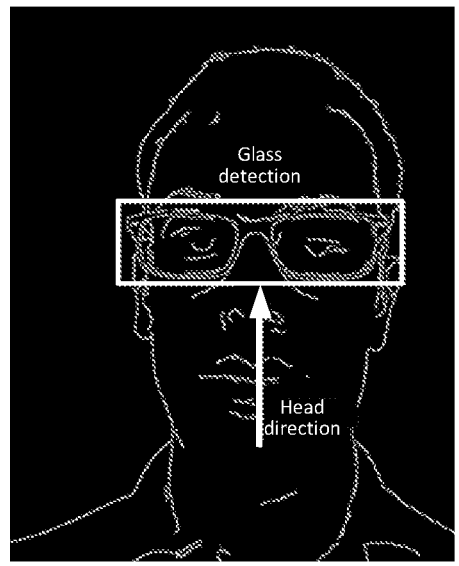
Figure 11D:
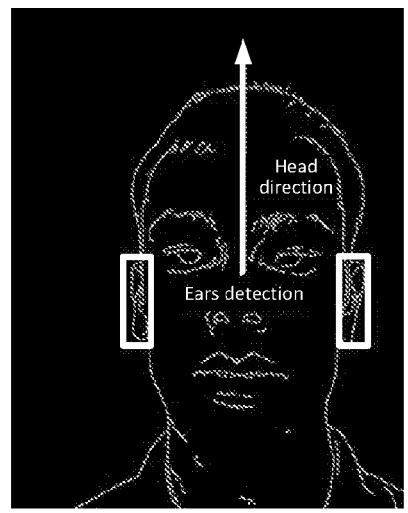
Figure 11E:
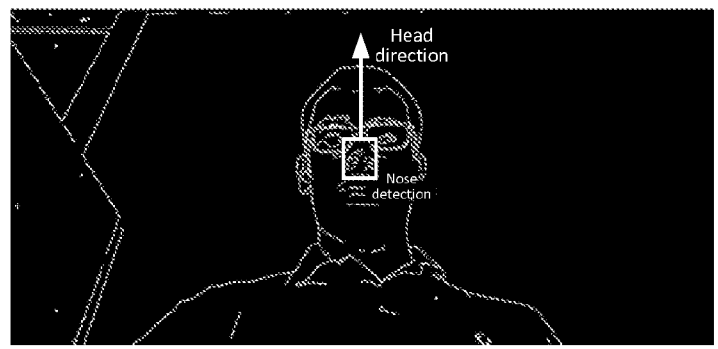
Figure 11F:
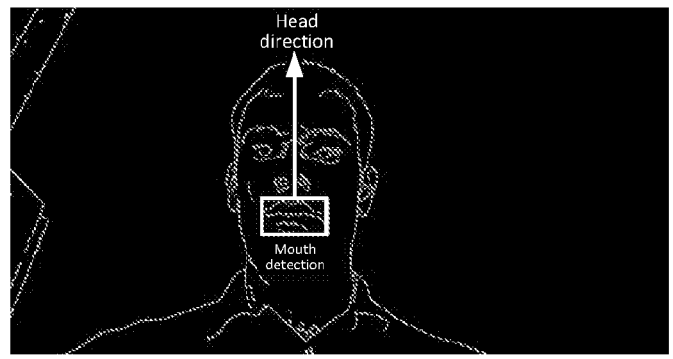

FIG. 11*a* illustrates the detection of the shoulders to detect the lower side of the user's face, indicating the direction of the person's head. FIG. 11*b* illustrates the detection of the user's eyes to detect the top of the user's face, indicating the direction of the person's head. FIG. 11*c* illustrates the detection of the user's eyeglasses to detect the top of the user's face, indicating the direction of the person's head. FIG. 11*d* illustrates the detection of the ears to detect the top of the user's face, indicating the direction of the person's head. FIG. 11*e* illustrates the detection of the user's nose to detect the top of the user's face, indicating the direction of the person's head. FIG. 11*f* illustrates the detection of the user's mouth to detect the bottom of the user's face, indicating the direction of the person's head. In various embodiments, combinations of the detected facial features are used to determine the direction of the person's head. For example, a combination of the user's nose and mouth would indicate the direction of the user's head, as the nose is above the mouth.

With reference to FIG. 4, at procedure 470, the misalignment angle is calculated. In one embodiment, procedure 470 includes estimating a fine heading misalignment angle.

Fine Heading Misalignment Angle Estimation

In one embodiment, a value of the heading misalignment angle estimation is determined in an attempt to provide an accurate value of the heading misalignment angle. Different methods are described for this purpose that exploit the extracted facial features and shoulders. Example 1, described below in greater detail, describes a method to estimate the heading misalignment angle using the ratio between the distances from middle neck point to each shoulder side. Similarly, in other examples, the other facial features such as ears, eyes, and face left and right edges in case of no ears appear in the image may also be used. In another example, locating ears and eyes with respect to the nose and/or mouth combination can be used to estimate the misalignment angle. In another example, the ratio between the distances from eyes to nose or from ears to nose can be used to identify the direction of the user face with respect to the device's camera. And in another example, where the person is wearing eyeglasses, the edges of the eyeglasses can be used in the same way as eyes. Sometimes the head hair might cover ears both or one of them. If only one ear is appeared the face edge of the other side can be used instead of the ear. Sometimes both ears are disappeared due to that the person is wearing hat or toque or has long hair. In this example, the ratio between the distances from the nose/mouth to the left and the right face edges can be used to estimate the heading misalignment angle. It should be appreciated that many different combinations of extracted facial features and shoulders can be used to accurately estimate the heading misalignment angle.

Moreover, the size of the different features such as shoulders, eyes, ears, and glasses in the image and/or the perspective of such elements or features can be used to identify the value of the misalignment angle or at least the sign of the misalignment angle (whether left or right of the user). The ratio between the sizes of the two sides of the feature or element (perspective of such feature or element) can be used to provide the heading misalignment angle. Furthermore, the comparison between the size of the different facial features, shoulders, or glasses with the knowledge of its location whether is left or right with respect to the image frame can indicate the sign of the misalignment angle.

The described algorithm for heading misalignment angle estimation from image may follow an opportunistic approach. The technique uses the different approaches upon the availability and identification of underlying elements/features in the image.

Integration of Vision-Based and Sensors-Based Heading Misalignment Estimation Using heading misalignment angle estimation from different sources makes the operation to be more robust. Different techniques based on mobile electronic devices having embedded-sensors measurements are available, and they estimate the heading misalignment angle for on foot activities. Adding another source of heading misalignment angle estimation by exploiting the image information enables providing a better estimate of the misalignment angle. Better misalignment angle estimation can lead the navigation system that may use this misalignment estimation to provide more accurate solution for heading estimation. Two different integration schemes, loosely and tightly, are proposed to integrate the heading misalignment angle from vision-based and sensors-based techniques. The information provided from the image can be used in different ways based on the quality of this information and the amount of features/information available from the image. A flag may be used to indicate whether this information is complete or partially complete. The method of the integration will benefit from this information in various ways and levels.

Heading misalignment loose integration refers to the use of the estimated angle from the vision-based technique to update/correct the heading misalignment angle estimated by the sensors-based approach. Based on the raised flag about the quality of the information from the image, the integration scheme will decide to update the estimated angle or not.

Heading misalignment tight integration refers to the use of the information provided from the image by the algorithm to enhance or update the estimated angle from the sensors-based method. The tight integration may be used whenever any helpful information from the images is available whether complete information or partial. Tight integration can provide help to the sensors-based misalignment even in case of partial information available from the image (e.g., information not sufficient to calculate an accurate misalignment angle on its own). If the raised flag decides that the image doesn't have enough features (e.g., as mentioned above), still the tight integration may be able to work, in this case the provided information may be used in different manners. For example, the location and size of the facial features, shoulder, or glasses pairs can be used provide the sign of the misalignment angle (e.g., the general direction whether left or right relative to the user). The sign may be used to double check the solution from the sensors-based method, or to provide feedback to the technique for sensors-based misalignment. An example of the latter case is when maximum variance-based techniques are used for sensor-based misalignment, those techniques first provide an angle with an ambiguity of 180 degrees, so the sign (or general direction) of misalignment from image can provide help in the decision about the direction of 180 degree ambiguity or can help remove or reduce errors in such decision. It should be appreciated that in this tightly-coupled integration scheme, any piece of information can be used individually or combined with other pieces of information to refine the estimated heading misalignment angle.

First Example of Heading Misalignment Angle Estimation Using Shoulders

Figure 12:
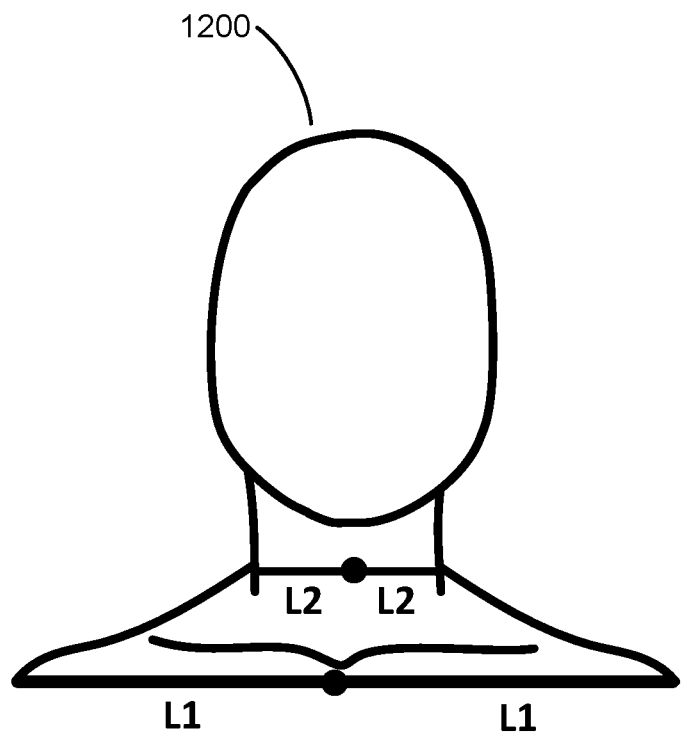
FIG. 12 shows two options of physical features of a person for use in determining a misalignment angle, in accordance with various embodiments.

In this example, the shoulder symmetry distance from the middle of the neck is used to estimate the heading misalignment angle. The present embodiment calculates the image lengths ratio of two detected objects with the same real (actual) lengths. The first procedure is detecting two objects with the same actual lengths. FIG. 12 shows two options of physical features of a person 1200 to detect these objects by using the edges of the neck or shoulders, in accordance with various embodiments. As shown, L1 is the length from the centerline of the body to the edge of the shoulder, and L2 is the length from the center of the neck to the edge of the neck. For purposes of the described embodiment, it is assumed that the person's body is substantially symmetrical such that the distances from the center of the body to the edges of the body are equal for both the right and left sides. Any differences are assumed to be of such small order as to be not considered in the calculations.

Figure 13A:
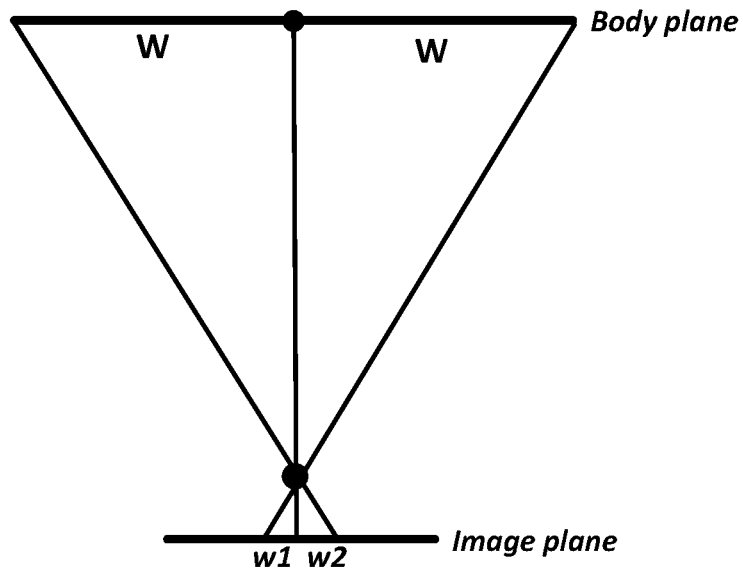
FIG. 13a shows an example image plane where the misalignment angle is equal to zero, in accordance with an embodiment.
Figure 13B:
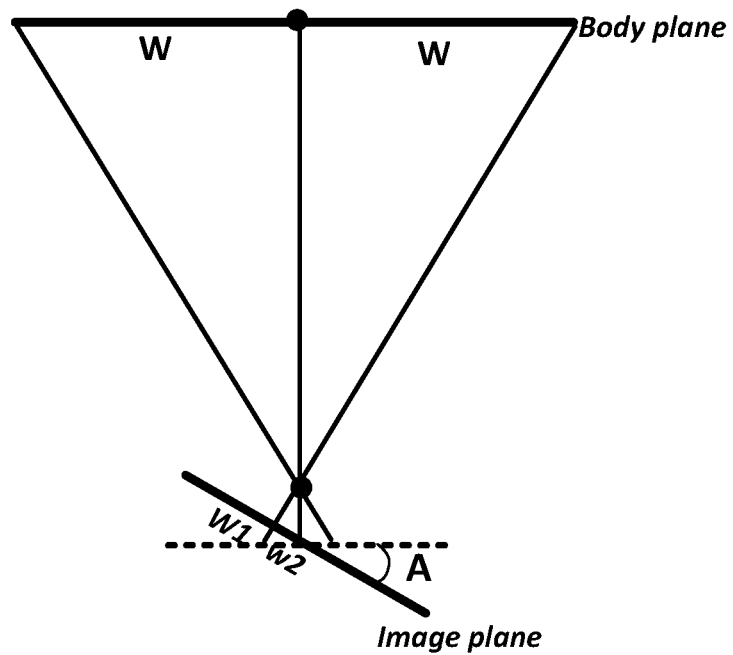
FIG. 13b shows an example image plane where the misalignment angle is not equal to zero, in accordance with an embodiment.
Figure 14A:
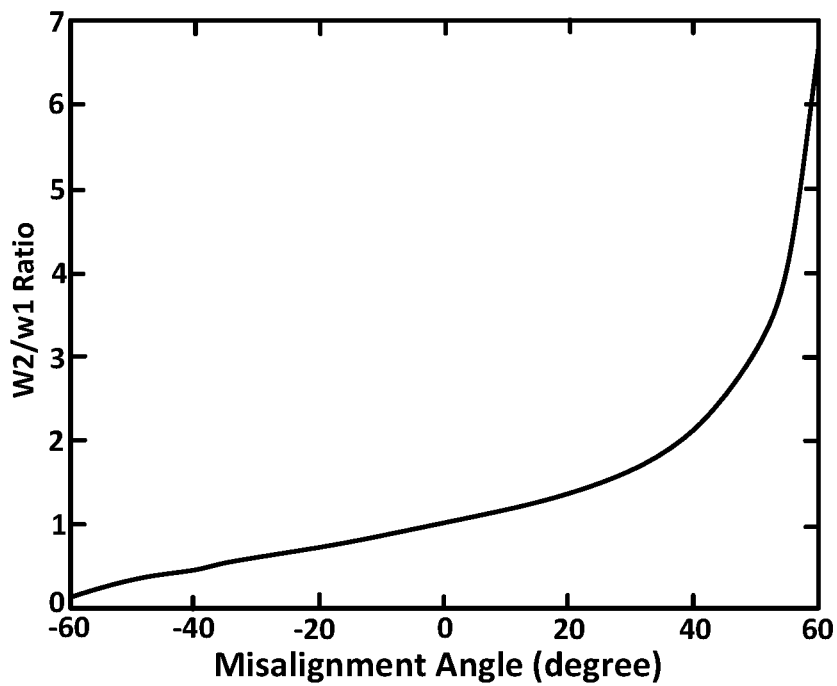
FIG. 14a shows an example graph of the ratio of detected shoulder edges and misalignment angle, in accordance with an embodiment.
Figure 14B:
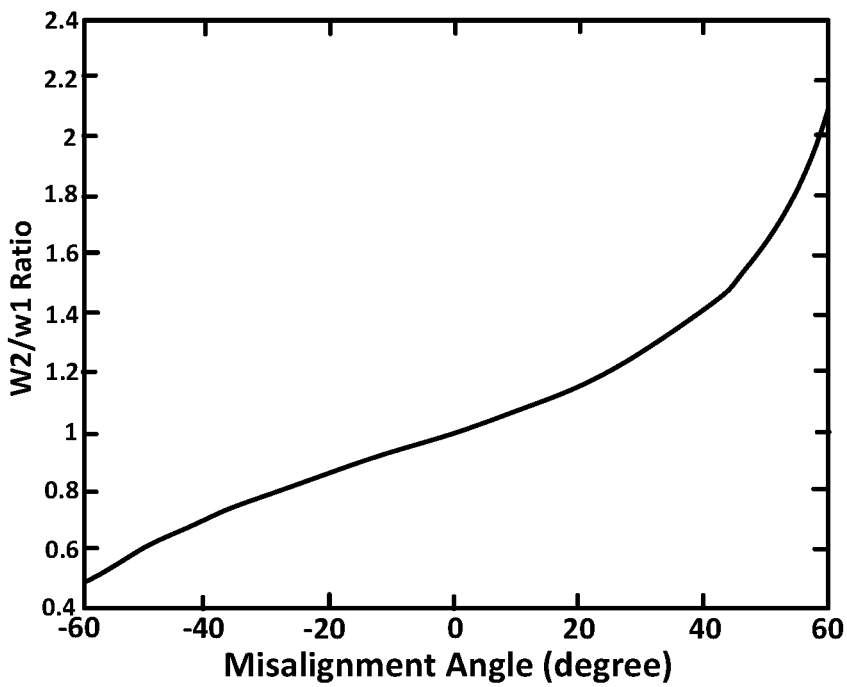
FIG. 14b shows an example graph of the ratio of detected neck edges and misalignment angle, in accordance with an embodiment.

The ratio of the detected edges in the image plane will vary based on the misalignment angle between the user and the smartphone. FIGS. 13a and 13b show two examples where the misalignment angles are equal to zero and non-zero values, respectively. As shown in FIGS. 13a and 13b, W refers to the actual distance of the detected physical feature (e.g., center of body to edge of shoulder) and w1 and w2 refer to the image distance of the same detected physical feature. The relationship between the ratio w2/w1 and the misalignment angle is shown in FIGS. 14a and 14b for both the detected shoulders edges and the detected neck edges, respectively (assuming that the focal length of the camera is 4.2 mm, L1 is equal to 21 cm and L2 is equal to 10 cm).

The following examples show an example of calculating the misalignment angle between the user and the image obtained from the smartphone camera using the above discussed method. FIGS. 15a-15e show example images for different misalignment angles, in accordance with various embodiments. To calculate the misalignment angle, the edge of the neck is detected to calculate the center point between the left and right shoulders. Furthermore, the edge points of the left and right shoulders are detected and the ratio between the lengths of the right and left shoulders from the center point (w2/w1) are then calculated and used to calculate the expected misalignment angle using curve chart shown in FIG. 14a. The used points in the following examples were detected manually. Table 1 shows the calculated w2/w1 ratio and its corresponding misalignment angles for the five example images.

TABLE 1

The calculated misalignment for different examples

Figure 15A:
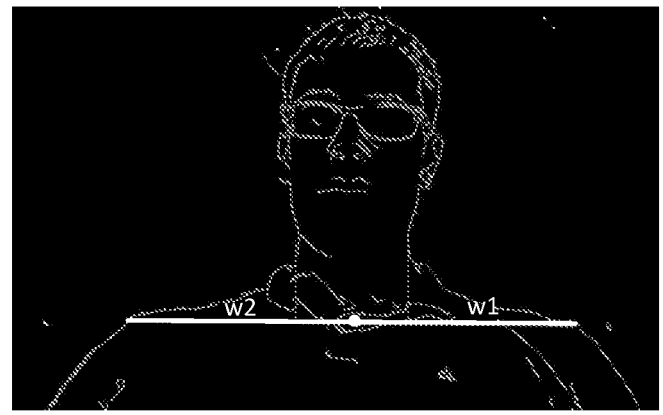
FIGS. 15a-15e show example images for different misalignment angles, in accordance with various embodiments.
Figure 15B:
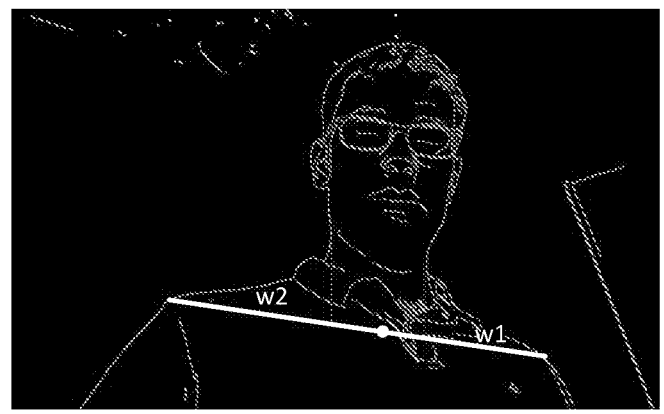
Figure 15C:
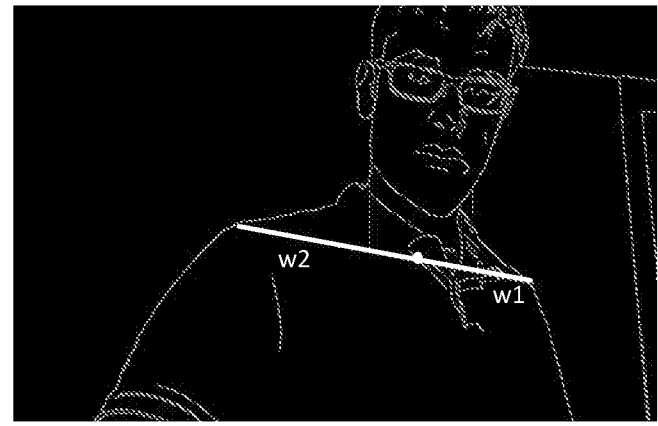
Figure 15D:
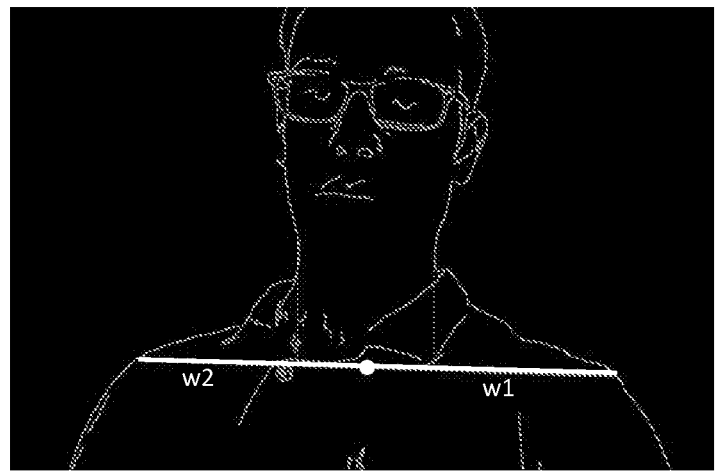
Figure 15E:
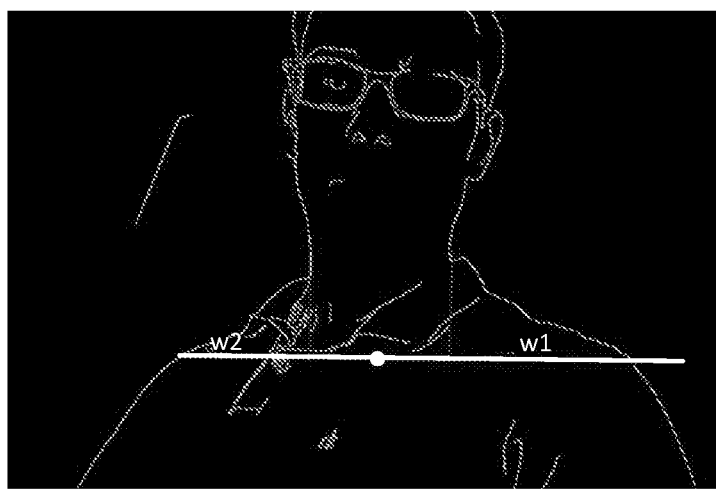

| Example number | w2/w1 | Estimated Angle |
|---|---|---|
| FIG. 15a | 1.0041 | 0° |
| FIG. 15b | 1.3147 | 18° |
| FIG. 15c | 1.5788 | 28° |
| FIG. 15d | 0.9130 | −6° |
| FIG. 15e | 0.7958 | −15° |

Second Example of Heading Misalignment Angle Estimation Using Shoulders

Figure 16:
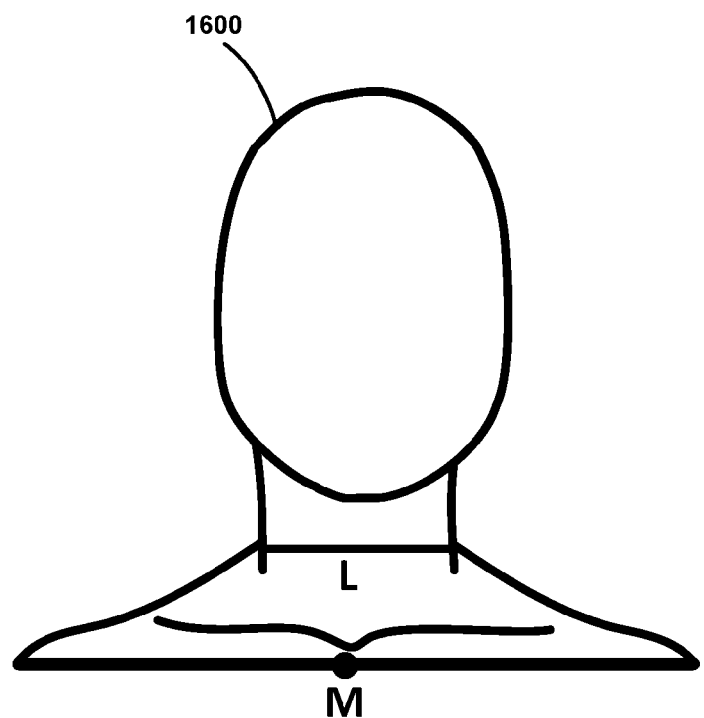
FIG. 16 shows two options of physical features of a person for use in determining a misalignment angle, in accordance with various embodiments.

In this example, the shoulder symmetry distance from the middle of the neck is used to estimate the heading misalignment angle. FIG. 16 shows two options of physical features of a person 1600 for use in determining a misalignment angle, in accordance with various embodiments. With reference to FIG. 16, using the different feature detection, the following information can be featured or assumed:

$L_{image}$ (pixel): The neck width of the image.

$M_{image}$ (pixel): The shoulder to shoulder width of the image.

$f_m$ (meter): The focal length of the camera in meters.

pixel_size (meter): the pixel size in the image plane in meters.

$L_m(m)$ (meter): The average human neck width in the ground coordinate frame

Approximations are calculated for the following quantities, as these values are used to calculate the misalignment angle:

$D_{pixels}$: An approximate depth of the camera from the user in the ground coordinate frame in pixels.

$W_{pixels}$: An approximate shoulder width in the ground coordinate frame in pixels.

The equivalent focal length in pixels is then calculated as shown in equation (10):

$$f_{pixels} = \frac{f_m}{pixel\_size} \quad (10)$$

The approximated depth in meter $D_m$ in the ground coordinate frame may be calculated using images from the optical sensor itself (such as the camera), or alternatively the depth can be calculated using an infrared sensor, ultrasonic sensor, or laser. Using infrared, ultrasonic and laser ranging sensors, depth $D_m$ can be obtained directly from the used sensors measurements. Using the images from the optical sensor or camera sensor, $D_m$ is calculated as shown in equation (11):

$$D_m = L_m * \frac{f_{pixels}}{L_{image}} \quad (11)$$

The approximated depth in pixels $D_{pixels}$ in the ground coordinate frame is then calculated as shown in equation (12):

$$D_{pixels} = D_m * \frac{f_{pixels}}{f_m} \quad (12)$$

The approximated shoulder width in meter $W_m$ in the ground coordinate frame is then calculated as shown in equation (13):

$$W_m = 0.5 * L_m * \frac{M_{image}}{L_{image}} \quad (13)$$

The approximated shoulder width in pixels $W_{pixels}$ in the ground coordinate frame is then calculated as shown in equation (14):

$$W_{pixels} = W_m * \frac{f_{pixels}}{f_m} \quad (14)$$

Figure 17:
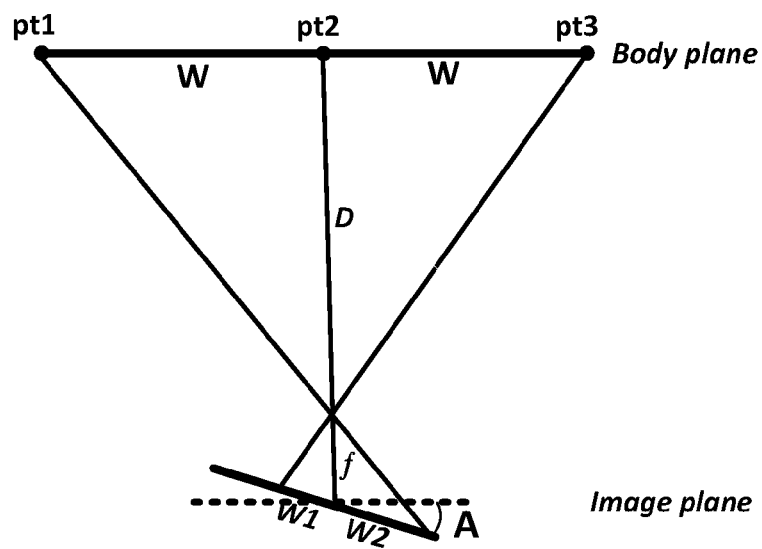
FIG. 17 shows an example image plane for use in determining a misalignment angle, in accordance with an embodiment.

FIG. 17 shows an example image plane for use in determining a misalignment angle, in accordance with an embodiment. Using the above calculated values, the user misalignment angle (A) can be calculated using equation (18) below, where $m_1$, $m_2$ and $m_3$, calculated in equations (15), (16) and (17), are the slopes of the light arrays between the right, left and center shoulder points and its corresponding image points in the image plane:

$$m_1 = \frac{-(D-f)(-W+f\sin(A)) - W((D-f) - f\cos(A)))}{(D-f) - f\cos(A) + \tan(A)(-W+f\sin(A))} \quad (15)$$

$$m_2 = \frac{-(D-f)(f\sin(A))}{(D-f) - f\cos(A) + \tan(A)(f\sin(A))} \quad (16)$$

$$m_3 = \frac{-(D-f)(W+f\sin(A)) + W((D-f) - f\cos(A)))}{(D-f) - f\cos(A) + \tan(A)(W+f\sin(A))} \quad (17)$$

$$\left|\frac{m_1 - m_2}{m_2 - m_3}\right| = \left|\frac{w_2}{w_1}\right| \quad (18)$$

Misalignment angle (A) can then be used to correct the heading of the device, improve the performance of the device, for example, while operating a navigation application.

Example Methods of Operation

FIGS. 18a-g illustrate a flow diagram 1800 of an example method for estimating heading misalignment between a device and a person, wherein the device comprises an optical sensor capable, according to various embodiments. Procedures of this method will be described with reference to elements and/or components of FIG. 3. It is appreciated that in some embodiments, the procedures may be performed in a different order than described, that some of the described procedures may not be performed, and/or that one or more additional procedures to those described may be performed. Flow diagram 1800 includes some procedures that, in various embodiments, are carried out by one or more processors under the control of computer-readable and computer-executable instructions that are stored on non-transitory computer-readable storage media (e.g., host memory 330). It is further appreciated that one or more procedures described in flow diagram 1800 may be implemented in hardware, or a combination of hardware with firmware and/or software.

With reference to FIG. 18*a*, at procedure 1810 of flow diagram 1800, in various embodiments, an image of the person is captured by the optical sensor. In one embodiment, the optical sensor is a camera. In another embodiment, the optical sensor is an infrared sensor. In various embodiments, this comprises optical sensor 335 capturing an image. In one embodiment, the image is stored in host memory 330.

With continued reference to FIG. 18*a*, at procedure 1820 of flow diagram 1800, in various embodiments, at least one physical feature of the person is extracted from the image. In various embodiments, the at least one physical feature of the person includes at least one or a combination of a head, shoulders, ears, eyes, a nose, a mouth, a neck, and eyeglasses. In various embodiments, this comprises host processor 310 performing feature extraction on the image. In one embodiment, procedure 1820 includes procedure 1840 of FIG. 18*b*. As shown at procedure 1840, preprocessing is performed on the image.

In another embodiment, procedure 1820 includes procedures 1850 and 1852 of FIG. 18*c*. As shown at procedure 1850, edge detection is performed on the image of the person. At procedure 1852, the at least one physical feature of the person is identified using detected edges of the image. In one embodiment, procedure 1820 also includes procedure 1854. As shown at procedure 1854, a Hough transform is performed using detected edges of the image. In one embodiment, the Hough transform is used to detect at least one or a combination of the following: (i) straight lines; or (ii) circles.

In another embodiment, procedure 1820 includes procedures 1860, 1862 and 1864 of FIG. 18*d*. As shown at procedure 1860, color analysis is performed on the image of the person. At procedure 1862, skin color of the person is detected. At procedure 1864, the at least one physical feature of the person is identified using the detected skin color.

As reference to FIG. 18*a*, flow diagram 1800 proceeds to procedure 1830. At procedure 1830, a misalignment angle is estimated using the at least one physical feature of the person extracted from the image. In various embodiments, this comprises host processor 310 estimating the misalignment angle using the at least one physical feature of the person extracted from the image.

In one embodiment, procedure 1830 includes procedure 1870 of FIG. 18*e*. As shown at procedure 1870, a coarse misalignment angle between the device and the person is estimated, where the coarse misalignment angle provides an indication of a relative orientation of the device from an orientation of the image relative to the device. In one embodiment, procedure 1830 also includes procedure 1872 and 1874. At procedure 1872, a relation between the at least one physical feature of the person relative to a frame of the image is determined. At procedure 1874, the coarse misalignment of the device is identified based on the relation. In one embodiment, the coarse misalignment of the device includes one of the following: portrait with zero degrees, landscape with 90 degrees, and landscape with −90 degrees.

In one embodiment, procedure 1830 includes procedure 1880 of FIG. 18*f*. As shown at procedure 1880, a fine misalignment angle between the device and the person is estimated, the fine misalignment angle providing a value of the heading misalignment between the device and the person. In one embodiment, procedure 1830 also includes procedure 1882 and 1884. At procedure 1882, an image length ratio of a first physical feature of the person to a second physical feature of the person is determined, wherein an actual length ratio of the first physical feature of the person to a second physical feature of the person is known. At procedure 1884, the fine misalignment angle is determined using the image length ratio and the actual length ratio.

In another embodiment, procedure 1830 also includes procedure 1886 and 1888. At procedure 1886, an image length ratio of a distance from a middle neck point to a left shoulder side to a distance from the middle neck point to a right shoulder side is determined. At procedure 1888, the fine misalignment angle is determined using the image length ratio.

Example Optional Enhancements to the Misalignment Angle Estimation

During normal use, the attitude of a device (e.g. portable phone) changes freely. Indeed, such devices often undergo rotational movements along any of their major axes (e.g. the x-axis, y-axis and z-axis) when positioned, for example, for texting in either landscape or portrait view. One possible definition of axes is as follows, the forward axis of the device is defined as x-axis, the vertical or z-axis is pointing downward and the transversal axis or y-axis is defined in a way to complete the right handed coordinate system. The orientation of a device within a platform (in the current disclosure a pedestrian carrying, holding or using the device) is not representative of the orientation of the platform or pedestrian. The device may undergo any number of rotational movements along any of its major axes, with respect to the platform. These rotational movements of the device do not indicate that the platform is going through the same changes in orientation. For example, the user or platform may be moving on a levelled 2D plane while the device may be undergoing any number of possible roll and pitch angles. Roll is defined as the rotation of the device along the forward x-axis, while pitch is the rotation along the lateral y-axis. Because the device user is free to rotate the device as desired, the device can have several changes in roll, pitch and azimuth (heading) with respect to the platform.

Typical portable devices include a tri-axial accelerometer for measuring accelerations or specific forces, along each of the sensitive axis, i.e., the x-axis, y-axis and the z-axis. The device may contain other sensors such as for example gyroscopes, magnetometers, barometer, among others.

Roll is defined as the rotation of the device along the forward x-axis, while pitch is the rotation along the lateral y-axis. Because the device user is free to rotate the device as desired, the device can have several changes in roll, pitch and azimuth (heading) with respect to the platform.

The pitch and roll values may be calculated from any one of the following among others: (i) gyroscopes through any one of different methods such as for example quaternions, (ii) accelerometer readings or averaged accelerometer readings (whether fixed-time average or moving average), (iii) integrated navigation solution using any type of integration technique and integrating different sensors and/or systems such as for example some or all of the following: accelerometers, gyroscopes, magnetometers, barometers, odometers, or any navigational information updates (such as, for example, GNSS, WiFi, or any other wireless technique). The roll and pitch values used for levelling may be instantaneous sample values or may be time averaged values (whether fixed time average or moving average) whether buffered or fed to the presented method epoch by epoch (each epoch corresponds to an accelerometer reading sample).

An optional step to make the buffered signals smooth; an LPF may be applied to the buffers.

An optional routine to give a misalignment angle output in case the main method gives a "no decision" output may be used; such routine is based on the history of any one or any combination of the following: (i) the buffered history of the corrected misalignment angle, (ii) the buffered history of the roll and pitch angles, or (iii) the buffered history of the azimuth (heading) angle.

An optional routine to enhance the misalignment angle calculation may be used, such routine is based on the history of any one or any combination of the following: (i) the buffered history of the corrected misalignment angle, (ii) the buffered history of the roll and pitch angles, or (iii) the buffered history of the azimuth (heading) angle. This routine may rely on smoothing, averaging, or any type of filtering of any one or any combination of the above list of buffered quantities. In some embodiments, an optional routine may be used to integrate the misalignment angle obtained using vision with the misalignment angle obtained using other means such as inertial sensors using averaging or any type of filtering or state estimation known to those skilled in the art.

An optional routine that calculates a standard deviation of the calculated misalignment angle may be used. In one embodiment, this routine may rely on the consistency of any one or any combination of the following: (i) the buffered history of the corrected misalignment angle, (ii) the buffered history of the roll and pitch angles, or (iii) the buffered history of the azimuth (heading) angle.

An optional routine to enhance the misalignment angle calculation of the present method when absolute navigational information (such as for example GNSS or WiFi among others) is available and capable of calculating a pedestrian or platform heading may be used. This means having a redundancy of information, for example: (i) device heading from one or more its self-contained sensors, a fused version of its self-contained sensors, or from an integrated navigation solution; (ii) misalignment from the present method; (iii) pedestrian heading from the absolute navigational information. In one embodiment, the information from (i) and (iii) can be used to calculate another version of misalignment between device and pedestrian that can enhance, be integrated or fused with, be averaged or filtered with the misalignment from (ii). In another embodiment, the other version of misalignment between device and pedestrian calculated from (i) and (iii) can be used with a machine learning or training technique together with the misalignment from (ii) (especially when the misalignment from (ii) has a poor performance possibly indicated by the optional calculation of its standard deviation) to obtain better misalignment in the same use cases even if those use cases occurred later in a navigation session or trajectory when the absolute navigational information is blocked, interrupted or degraded. In yet another embodiment, both the preceding two ideas can both be applied in a third embodiment.

Any one or any combination of the optional routines can be used.

Example Calculation of User Heading

Figure 18G:
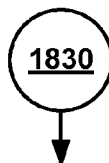

In one embodiment, flow diagram 1800 proceeds to procedure 1890 of FIG. 18g. At procedure 1890, a heading of the person is obtained from a heading of the device and the estimated misalignment angle. The heading of the user $H_{user}$ can be calculated using Equation (19) where $\theta_{device}$ is the misalignment angle and $H_{device}$ is the device heading angle which can be calculated using gyroscopes and/or magnetometers sensors of the device.

$$H_{user} = H_{device} - \theta_{device} \qquad (19)$$

Example Usages of the Estimated Misalignment Angle

Figure 18H:

In one embodiment, flow diagram 1800 proceeds to procedure 1892 of FIG. 18h. At procedure 1892, the misalignment angle is used to provide an enhanced navigation solution. It should be noted that the present method may be used in a variety of applications including those that involve 2D or 3D navigation solutions including:
  2D or 3D position, velocity and attitude; or
  only 2D or 3D position and attitude;
or partial 2D or 3D navigation solutions including:
  only 2D or 3D velocity and attitude; or
  only 2D or 3D attitude.
In case of 2D solutions, attitude is only the azimuth (heading) angle.

As an example application, the present method may be used with a pedestrian dead-reckoning (PDR) solution. PDR needs a pedestrian heading (azimuth) together with step detection and step length. The sensors in the device (such as for example accelerometers, gyroscopes, and magnetometers) can only give the device heading (azimuth) not the pedestrian heading. These two are not the same and have a misalignment between them depending on the use case of the device. So, if there is no absolute navigational information (such as for example GNSS or WiFi), or if the quality or nature of any available absolute navigational information is not adequate or not capable of calculating a pedestrian heading, then misalignment between device heading and pedestrian heading is needed in order to calculate the pedestrian heading given the device heading obtained from its self-contained sensors. The calculated pedestrian heading will be used for PDR. Even in cases where absolute navigational information is available, and the device heading and the misalignment can be used to calculate a pedestrian heading to be used for PDR, then this solution can be integrated with the absolute navigational information to give a better solution that mitigates the drawbacks of both dead-reckoning and absolute navigational information. Any state estimation or filtering technique can be used for such integration.

In another example application, the misalignment angle from the present method can be used with any 2D or 3D navigation application wherein motion constraints that need this misalignment angle are applied to enhance the positioning or navigation solution (without any physical constraint on the usage of the device) such as, for example:
  Non Holonomic Constraints (NHC): NHC is in the moving platform frame (which is here the pedestrian frame); so in order to apply NHC the transformation between the device frame and the pedestrian frame is needed which relies on the misalignment angle obtained by the present method.
  PDR applied as a constraint to another integrated navigation solution whether a 2D or 3D navigation solution, thereby providing improved positioning performance with low-cost sensors rather than general inertial navigation. The dependence of PDR on the misalignment angle calculated by the present method is explained earlier. In general, the PDR results can be used in any of the following ways: i) to provide measurement updates for the navigation solution (in addition to the possible calculation of the standard deviations for these updates), ii) to be integrated with the navigation solution in a Least Squares sense, or iii) to be used as the only standalone positioning and navigation solution (as described above).

Map constraints: if environment maps (of any type) are available, the map constraints can be used to enhance the navigation solution. In order to use such constraints the pedestrian heading is needed, which can be calculated from the device heading and the misalignment calculated by the present method. If there is no absolute navigational information (such as for example GNSS or WiFi), or if the quality or nature of any available absolute navigational information is not adequate or not capable of calculating a pedestrian heading, then misalignment between device heading and pedestrian heading is used to calculate the pedestrian heading given the device heading obtained from the self-contained sensors. The calculated pedestrian heading will be used for the map constraint for the navigation solution. Even in cases where absolute navigational information is available, the device heading and the misalignment can be used to calculate a pedestrian heading to be further integrated with the absolute navigational information to give a better solution. The map constraints to enhance a navigation solution can be used if PDR is utilized to further enhance the solution, or can be used if PDR is not used to enhance the main navigation solution.

When the method presented herein is combined in any way with a navigation solution whether 2D or 3D, this navigation solution can use any type of state estimation or filtering techniques. The state estimation technique can be linear, nonlinear or a combination thereof. Different examples of techniques used in the navigation solution may rely on a Kalman filter, an Extended Kalman filter, a non-linear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example a loosely coupled integration scheme or a tightly coupled integration scheme among others. The navigation solution may utilize modeling (whether with linear or non-linear, short memory length or long memory length) and/or automatic calibration for the errors of inertial sensors and/or other sensors used.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that techniques of this disclosure can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (e.g., real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g., for applications where GNSS is not applicable). Examples of these wireless communication systems used for positioning are, such as, those provided by cellular phone towers and signals, radio signals, digital television signals, WiFi, or WiMax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for estimating heading misalignment between a device and a person, wherein the device comprises an optical sensor capable of capturing an image, the method comprising:
   capturing an image of the person by the optical sensor;
   extracting at least one physical feature of the person from the image; and
   estimating a fine misalignment angle between the device and the person using the at least one physical feature of the person extracted from the image, the fine misalignment angle providing a value of the heading misalignment between the device and the person, wherein the heading misalignment is a difference between a heading of the device and a direction of motion of the person.

2. The method as recited in claim 1, wherein the extracting the at least one physical feature of the person from the image of the person further comprises:
   performing preprocessing on the image.

3. The method as recited in claim 1, wherein the extracting the at least one physical feature of the person from the image of the person comprises:
   performing edge detection on the image of the person; and
   identifying the at least one physical feature of the person using detected edges of the image.

4. The method as recited in claim 3, wherein the extracting the at least one physical feature of the person from the image of the person further comprises:
   performing a Hough transform using detected edges of the image.

5. The method as recited in claim 4, wherein the Hough transform is used to detect at least one or a combination of the following: (i) straight lines; and (ii) circles.

6. The method as recited in claim 1, wherein the extracting the at least one physical feature of the person from the image of the person comprises:
   performing color analysis on the image of the person;
   detecting skin color of the person; and
   identifying the at least one physical feature of the person using the skin color.

7. The method as recited in claim 1, wherein the at least one physical feature of the person comprises at least one or a combination of a head, shoulders, ears, eyes, a nose, a neck, a mouth, and eyeglasses.

8. The method as recited in claim 1, further comprising:
   estimating a coarse misalignment between the device and the person, the coarse misalignment providing an indication of relative orientation of the device from an orientation of the image relative to the device.

9. The method as recited in claim 8, wherein the estimating a coarse misalignment between the device and the person comprises:
   determining a relation between the at least one physical feature of the person relative to a frame of the image; and
   identifying the coarse misalignment based on the relation.

10. The method as recited in claim 8, wherein the coarse misalignment comprises one of the following: portrait with zero degrees, landscape with 90 degrees, and landscape with −90 degrees.

11. The method as recited in claim 1, wherein the estimating a fine misalignment angle between the device and the person comprises:
   determining an image length ratio of a first physical feature of the person to a second physical feature of the person, wherein an actual length ratio of the first physical feature of the person to a second physical feature of the person is known; and
   determining the fine misalignment angle using the image length ratio and the actual length ratio.

12. The method as recited in claim 1, wherein the estimating a fine misalignment angle between the device and the person comprises:
   determining an image length ratio of a distance from a middle neck point to a left shoulder side to a distance from the middle neck point to a right shoulder side; and
   determining the fine misalignment angle using the image length ratio.

13. The method as recited in claim 1 further comprising:
   obtaining a heading of the person from a heading of the device and the fine misalignment angle.

14. The method as recited in claim 1 further comprising:
   using the fine misalignment angle to provide an enhanced navigation solution.

15. A portable device comprising:
   an optical sensor configured to capture images;
   a processor configured to receive images from the optical sensor and operable to estimate heading misalignment between the portable device and a person, wherein the processor is operable to:
   receive an image of the person from the optical sensor;
   extract at least one physical feature of the person from the image; and
   estimate a fine misalignment angle between the portable device and the person using the at least one physical feature of the person extracted from the image, the fine misalignment angle providing a value of the heading misalignment between the portable device and the person, wherein the heading misalignment is a difference between a heading of the portable device and a direction of motion of the person.

16. The portable device as recited in claim 15, wherein the processor is further operable to:
   perform preprocessing on the image.

17. The portable device as recited in claim 15, wherein the processor is further operable to:
   perform edge detection on the image of the person; and
   identify the at least one physical feature of the person using detected edges of the image.

18. The portable device as recited in claim 17, wherein the processor is further operable to:
   perform a Hough transform using detected edges of the image.

19. The portable device as recited in claim 18, wherein the Hough transform is used to detect at least one or a combination of the following: (i) straight lines; and (ii) circles.

20. The portable device as recited in claim 15, wherein the processor is further operable to:
   perform color analysis on the image of the person;
   detect skin color of the person; and
   identify the at least one physical feature of the person using the skin color.

21. The portable device as recited in claim 15, wherein the at least one physical feature of the person comprises at least one or a combination of a head, shoulders, ears, eyes, a nose, a neck, a mouth, and eyeglasses.

22. The portable device as recited in claim 15, wherein the processor is further operable to:
   estimate a coarse misalignment between the portable device and the person, the coarse misalignment providing an indication of relative orientation of the portable device from an orientation of the image relative to the portable device.

23. The portable device as recited in claim 22, wherein the processor is further operable to:
   determine a relation between the at least one physical feature of the person relative to a frame of the image; and
   identify the coarse misalignment based on the relation.

24. The portable device as recited in claim 22, wherein the coarse misalignment comprises one of the following: portrait with zero degrees, landscape with 90 degrees, and landscape with −90 degrees.

25. The portable device as recited in claim 15, wherein the processor is further operable to:
   determine an image length ratio of a first physical feature of the person to a second physical feature of the person, wherein an actual length ratio of the first physical feature of the person to a second physical feature of the person is known; and
   determine the fine misalignment angle using the image length ratio and the actual length ratio.

26. The portable device as recited in claim 15, wherein the processor is further operable to:
   determine an image length ratio of a distance from a middle neck point to a left shoulder side to a distance from the middle neck point to a right shoulder side; and
   determine the fine misalignment angle using the image length ratio.

27. The portable device as recited in claim 15, wherein the processor is further operable to:
   obtain a heading of the person from a heading of the portable device and the fine misalignment angle.

28. The portable device as recited in claim 15, wherein the processor is further operable to:
   use the fine misalignment angle to provide an enhanced navigation solution.

* * * * *